(12) United States Patent
Ninan et al.

(10) Patent No.: US 9,262,951 B2
(45) Date of Patent: Feb. 16, 2016

(54) STEREOSCOPIC 3D DISPLAY SYSTEMS AND METHODS FOR IMPROVED RENDERING AND VISUALIZATION

(75) Inventors: Ajit Ninan, San Jose, CA (US); Matthew Chang, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 437 days.

(21) Appl. No.: 13/514,005

(22) PCT Filed: Dec. 8, 2010

(86) PCT No.: PCT/US2010/059544
§ 371 (c)(1),
(2), (4) Date: Jun. 5, 2012

(87) PCT Pub. No.: WO2011/084331
PCT Pub. Date: Jul. 14, 2011

(65) Prior Publication Data
US 2012/0242662 A1 Sep. 27, 2012

Related U.S. Application Data

(60) Provisional application No. 61/286,914, filed on Dec. 16, 2009.

(51) Int. Cl.
*G06T 15/00* (2011.01)
*G09G 3/00* (2006.01)
*H04N 13/04* (2006.01)
*G06T 19/00* (2011.01)

(52) U.S. Cl.
CPC ........... *G09G 3/003* (2013.01); *H04N 13/0438* (2013.01); *G06T 19/00* (2013.01); *G09G 2340/0435* (2013.01); *G09G 2340/16* (2013.01)

(58) Field of Classification Search
USPC ......................................................... 345/419
See application file for complete search history.

(56) References Cited

U.S. PATENT DOCUMENTS

| 5,510,831 | A | 4/1996 | Mayhew |
| 6,448,952 | B1 | 9/2002 | Toyoda |
| 6,476,850 | B1 * | 11/2002 | Erbey .............................. 348/51 |
| 7,307,609 | B2 | 12/2007 | Chang |
| 7,345,665 | B2 | 3/2008 | Chang |
| 7,348,952 | B2 | 3/2008 | Chang |
| 2006/0187298 | A1 | 8/2006 | Jacobs |
| 2007/0229395 | A1 | 10/2007 | Slavenburg |
| 2008/0036696 | A1 | 2/2008 | Slavenburg |

(Continued)

FOREIGN PATENT DOCUMENTS

EP 2015589 1/2009

*Primary Examiner* — Stephen R Koziol
*Assistant Examiner* — Terrell Robinson

(57) ABSTRACT

Techniques for stereoscopic 3D display systems with active shuttered glasses are provided which overcomes the real-world limitations of sample/load & hold displays, resulting in greater overall brightness, while reducing crosstalk between each eye perspective. In some embodiments, a first left-eye perspective frame and a first right-eye frame are determined from image data. A first composite frame of a first type is then created. This first composite frame of the first type comprises one or more left-eye pixel values from the first left-eye frame and one or more right-eye pixel values from the first right-eye frame. The first composite frame of the first type is outputted to the display area. This may also include use of scanning backlight synchronized to loading/hold of display in conjunction with the composite frame.

16 Claims, 16 Drawing Sheets

(56) References Cited

U.S. PATENT DOCUMENTS

| | | | |
|---|---|---|---|
| 2008/0151040 A1* | 6/2008 | Kim | 348/42 |
| 2009/0109127 A1* | 4/2009 | Chang et al. | 345/6 |
| 2009/0237495 A1* | 9/2009 | Kawahara | 348/56 |
| 2011/0050850 A1* | 3/2011 | Yamada | 348/43 |

* cited by examiner

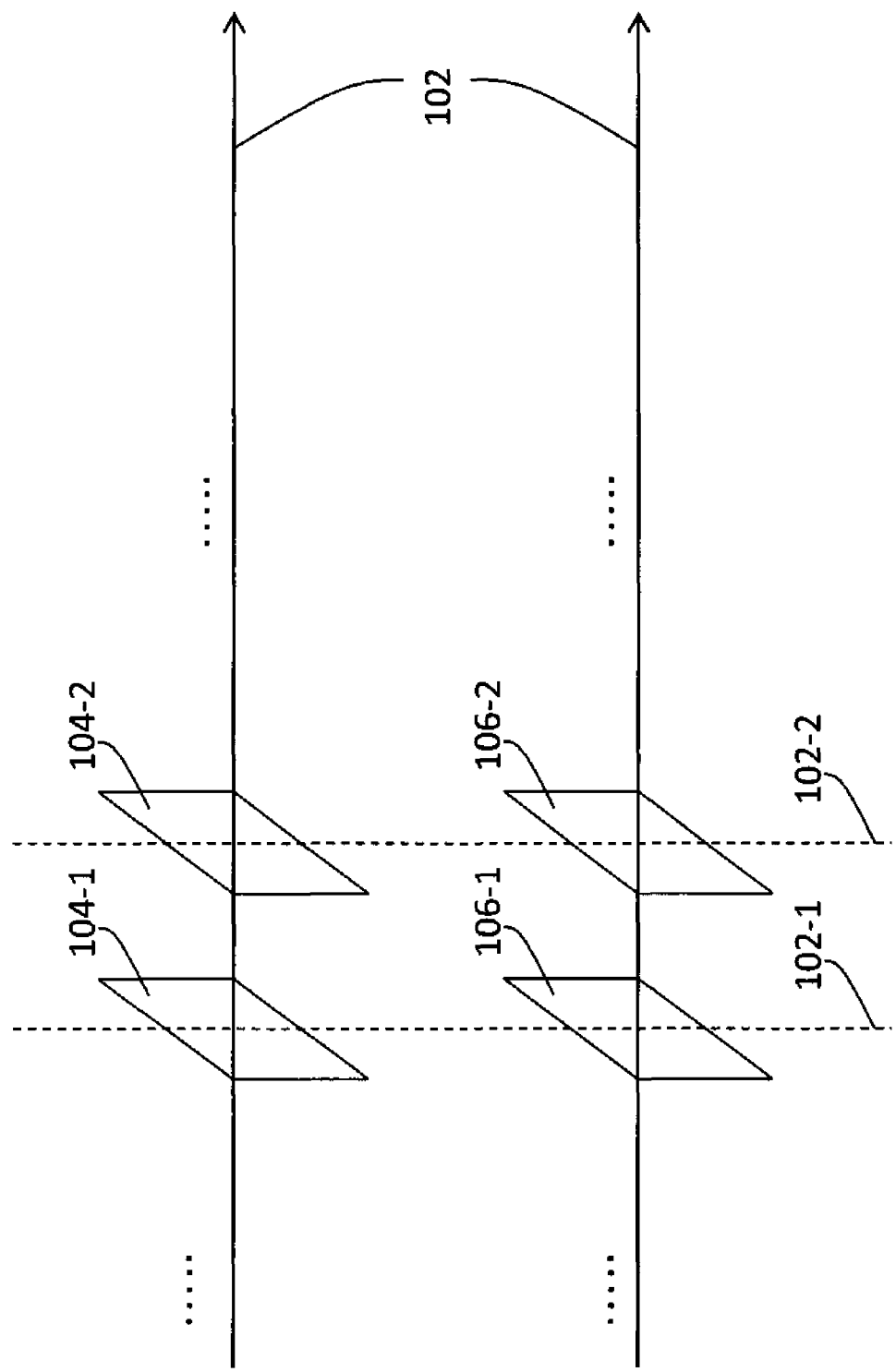

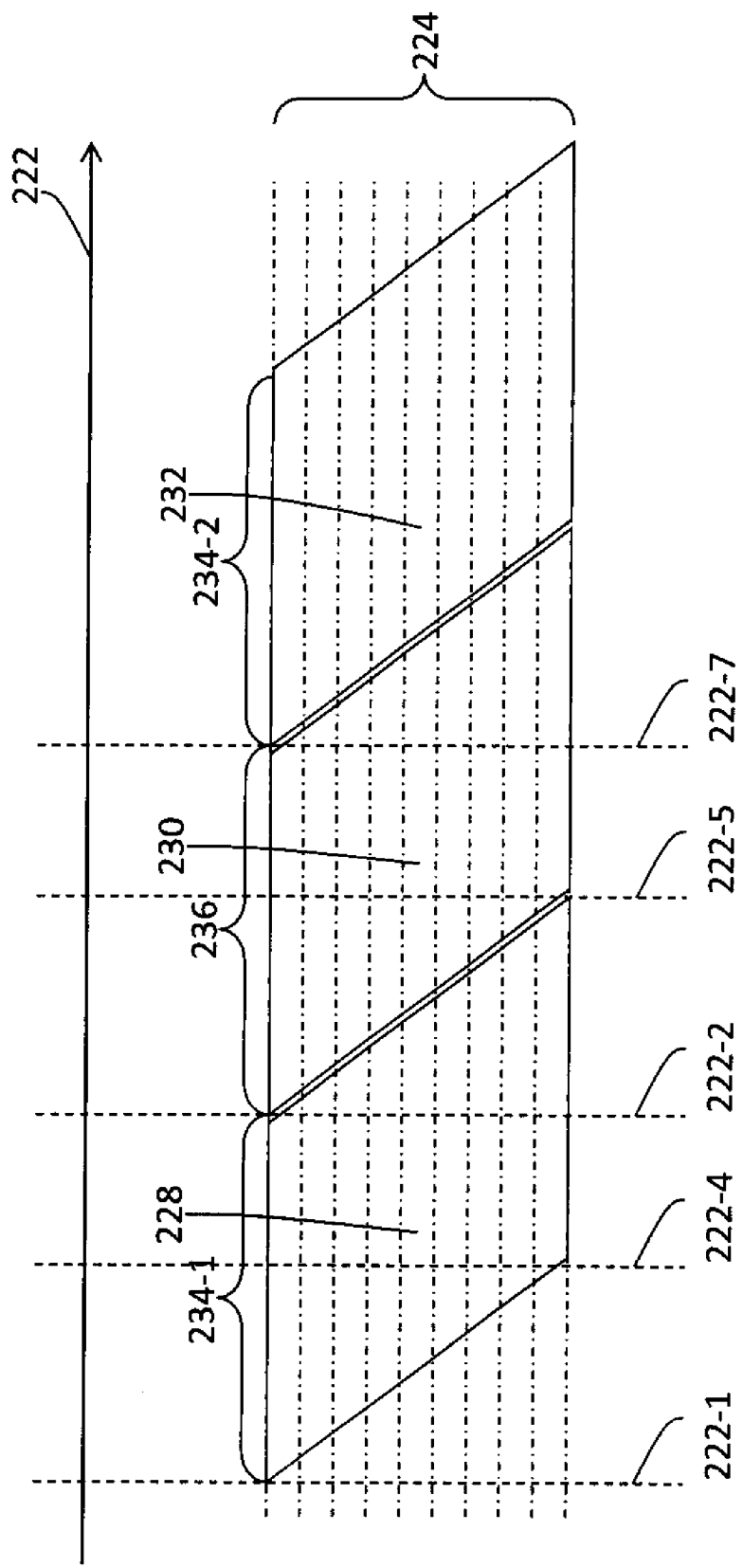

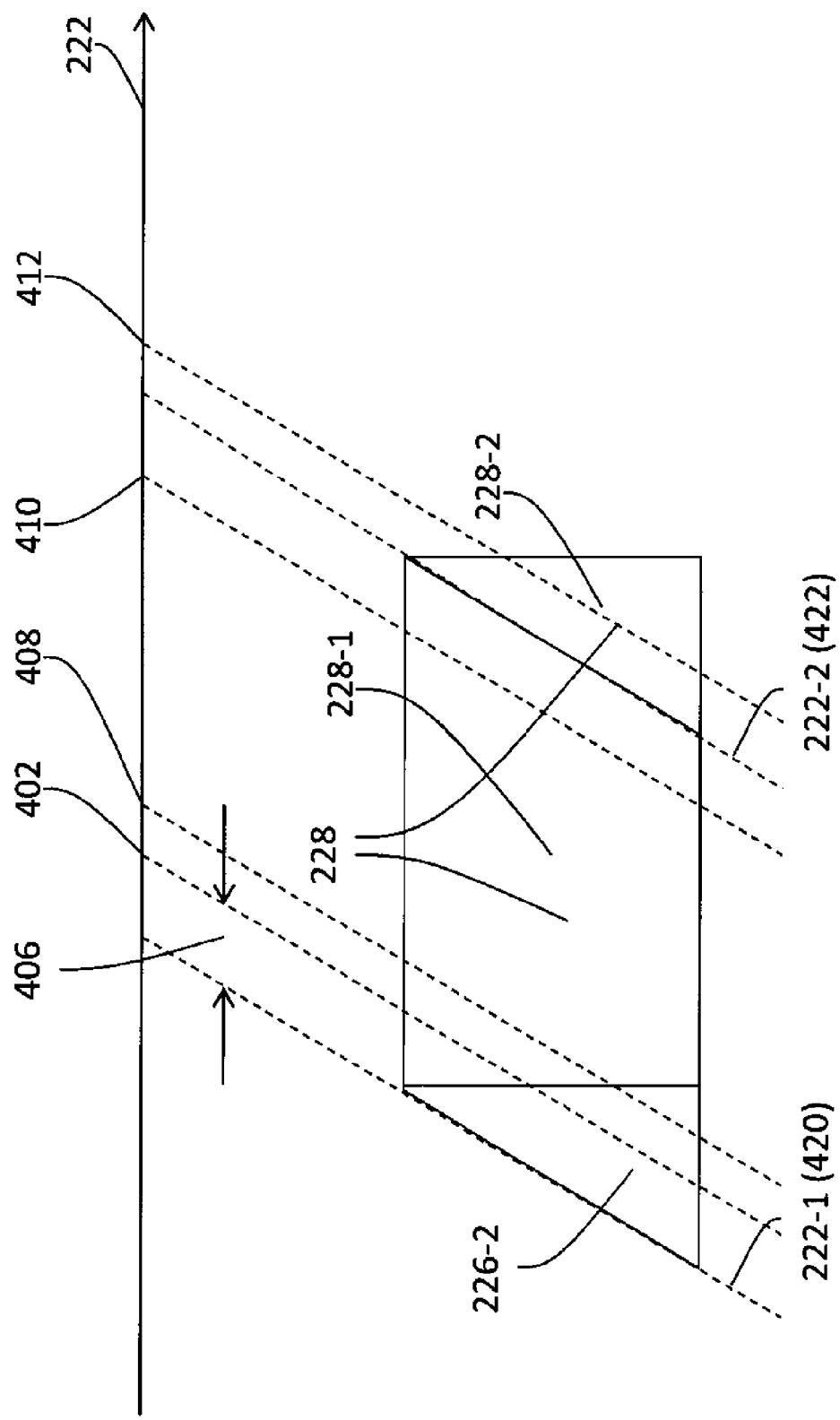

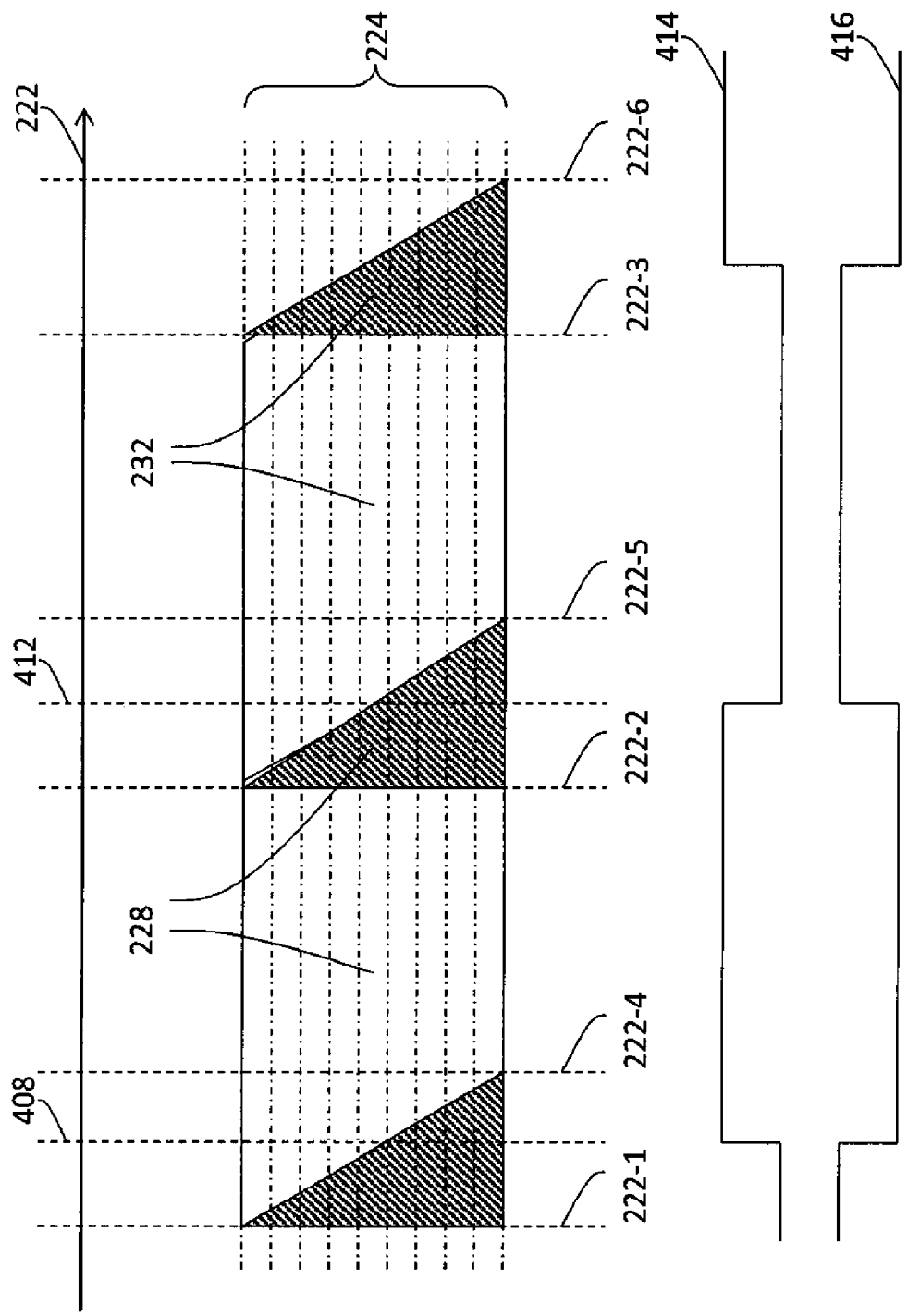

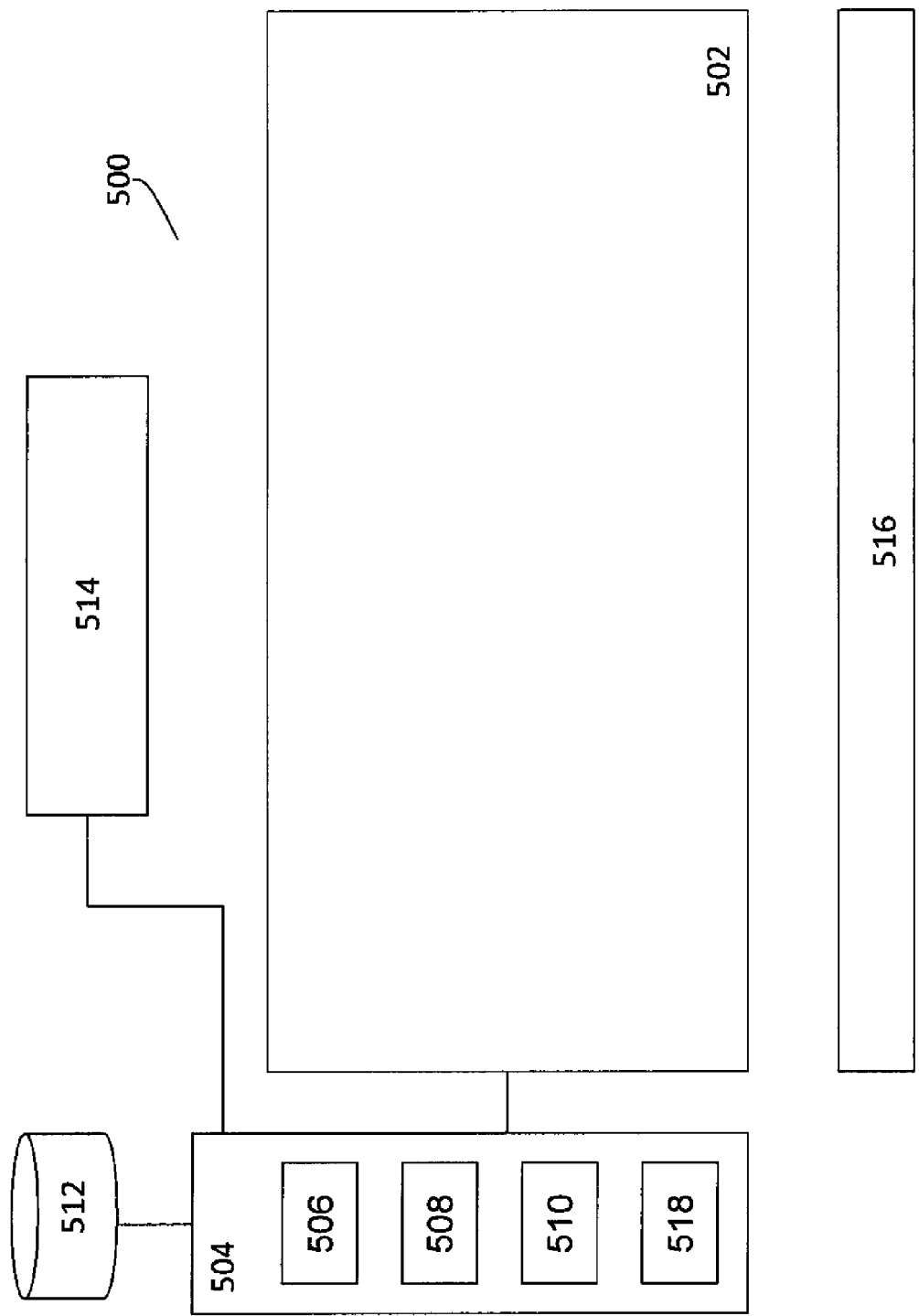

STEREOSCOPIC 3D DISPLAY SYSTEMS AND METHODS FOR IMPROVED RENDERING AND VISUALIZATION

CROSS-REFERENCE TO RELATED APPLICATIONS

This application claims priority to U.S. Provisional Patent Application No. 61/286,914 filed 16 Dec. 2009, which is hereby incorporated by reference in its entirety.

TECHNOLOGY

The present invention relates generally to display systems, and in particular, to display systems that display three-dimensional (3D) images.

BACKGROUND

In stereoscopic 3-D display systems, 3-D effect is achieved by presenting slightly different perspectives to each left & right-eye, offset by the distance between the pupils. In frame-sequential implementation of stereoscopic 3-D display systems, image frames for left and right-eye perspectives are not displayed to a viewer simultaneously. Rather, image frames from left and right-eye perspectives may be time sequentially, alternatively displayed. For example, a left-eye frame may be followed by a right-eye frame, which in turn may be followed by a subsequent left-eye frame, which in turn is followed by a subsequent right-eye frame, and so on. To perceive 3D effects from the sequential playing of image frames of different perspectives, the viewer is typically required to wear shuttered glasses (otherwise known as "active" 3-D glasses). Moreover, the shuttered glasses are synchronized with the playing of image frames to ensure that each eye only "sees" one perspective. When a left-eye frame is displayed, the shuttered glasses only open the left-eye, blocking the right-eye; when a right-eye frame is displayed, the shuttered glasses only open the right-eye, blocking the left-eye. Ideally, through the shuttered glasses, a left-eye frame would be seen by the viewer's left eye only, while a right frame seen by the viewer's right eye only. However, even with the shuttered glasses perfectly synchronized to the playing of image frames on a LCD 3-D display, the viewer typically still sees crosstalk between frames of different perspectives i.e. the viewer may see image data of the right-eye perspective from a previous right image frame when the viewer is supposed to see only a left image frame, or vice versa. This occurs because a frame of a single perspective cannot be instantaneously replaced with a new frame of the opposite perspective with LCD 3-D displays. The effect of this is a degradation of the stereoscopic 3-D effect, which can also result in fatiguing of the viewer, as the perspective perception cues become inconsistent with what one would naturally see.

In some approaches, open/close duty cycles of shuttered glasses may be significantly reduced in order to give the viewer a narrower temporal window during which the viewer may see a frame of a single perspective and thus less potential crosstalk between eyes. Specifically, the temporal window may be synchronized with the playing of frames in a display system in such a manner that, in the narrow temporal window, the viewer only sees the frame of a single perspective such as a left frame or a right frame when the frame of the single perspective has fully replaced a previous frame of a different perspective. However, as the temporal window is narrowed by shortening the opening of the "shutter" for an eye, the user will perceive dimmer images, and most of the backlight is wasted when the viewer is blocked from seeing any frame by the shuttered glasses. This is a real-world trade-off in active glasses 3-D systems between crosstalk vs. brightness. Still, the shuttered glasses must be capable of performing fast and responsive switching within very tight timing requirements, in order to realize a precise synchronization of the operation of the shuttered glasses with the displaying of frames.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A and FIG. 1B illustrate example frames of single perspectives in image data, according to possible embodiments of the present invention;

FIG. 2B and FIG. 2C illustrate an example operation of 3D display systems that implement composite frame techniques, according to possible embodiments of the present invention;

FIG. 4A illustrates an example illumination operation for a composite frame, according to possible embodiments of the present invention;

FIG. 4B illustrates example waveforms for left and right-eye perspectives of shuttered glasses, according to possible embodiments of the present invention;

FIG. 5A and FIG. 5B are example system block diagrams for 3D display systems, according to possible embodiments of the present invention;

DESCRIPTION OF EXAMPLE POSSIBLE EMBODIMENTS

Figure 1B:
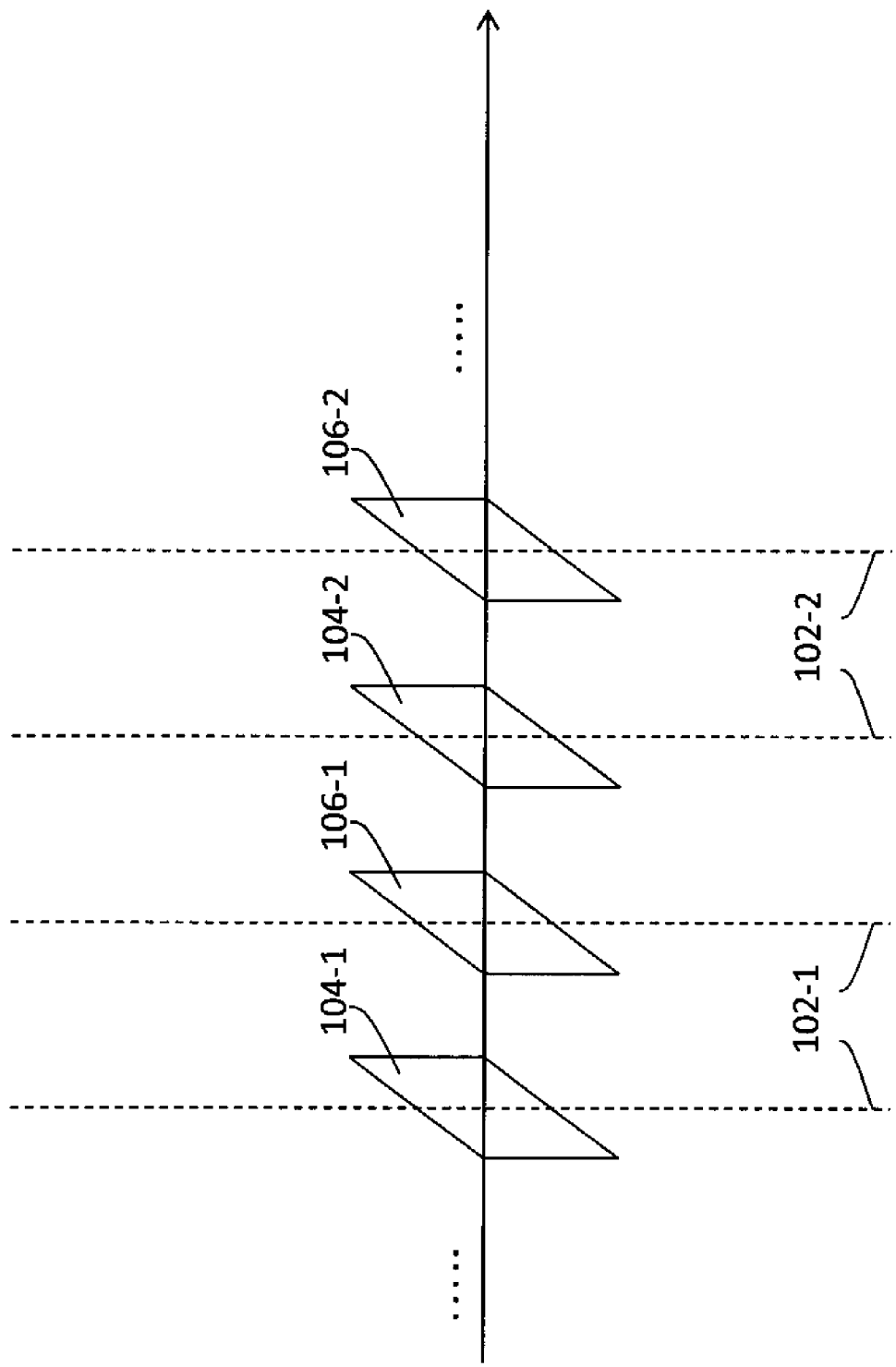

Example possible embodiments, which relate to 3D display systems with shuttered glasses, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obfuscating, or obfuscating the present invention.

Example embodiments are described herein according to the following outline:

1. General Overview
2. Image Data Comprising Frames of Single Perspectives
3. Load-and-Hold Techniques
4. Composite Frames
5. Time-Domain and Spatial-Domain Representations
6. Example Composite Frames
7. Example Illumination
8. Example Coordination with Shuttered Glasses
9. Example System Architectures
10. Example Process Flow
11. Implementation Mechanisms—Hardware Overview
12. Equivalents, Extensions, Alternatives and Miscellaneous

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiments in a condensed and simplified format, and should be understood as merely a conceptual prelude to a more detailed description of example possible embodiments that follows below.

In some possible embodiments, a sequence of left-eye frames and a sequence of right-eye frames may be determined from image data received by a 3D display system. The sequences of left and right frames, for example, may contain audiovisual content such as a movie. The left frames are designated for the left eye of a viewer to view, while the right frames are designated for the right eye of the viewer to view. In some possible embodiments, the viewer may view images through shuttered glasses, the opening of which for a particular perspective may be controlled when a shuttered glasses controller receives control signals from a display controller of the 3D display system.

Under techniques described herein, instead of directly scanning frames of a single perspective (i.e., either entirely left frames or right frames), composite frames of mixed perspectives are created based on the left frames and the right frames in the received image data. A composite frame incorporates pixels values from both left and right frames as determined from the image data to substantially reduce or eliminate crosstalk, a counterintuitive result.

In some possible embodiments, left frames and right frames are converted into two types of composite frames, which may be referred to as (1) a composite frame of a first type (or a type-I composite frame), and (2) a composite frame of a second type (or a type-II composite frame).

In some possible embodiments, a composite frame comprises a plurality of scan line segments that start scanning in a time sequential order along a certain spatial dimension of a display area. This first spatial dimension may be a vertical direction of the display area. Each of the plurality of scan line segments scans along a second spatial dimension of the display area. This second spatial dimension may be a horizontal direction of the display area.

In some possible embodiments, a type-I composite frame comprises an upper-left portion of pixel values from a left frame and a lower-right portion of pixel values from a right frame. In contrast, a type-II composite frame comprises an upper-left portion of pixel values from a right frame and a lower-right portion of pixel values from a left frame. As used herein, the term "pixel" can refer to a display unit (e.g., a liquid crystal unit structure that is used as a pixel or subpixel) in a display area of a display panel in a display system. The term "pixel value" can refer to a unit of data in a frame that is to be loaded into a corresponding pixel in the display area of the display panel in the display system.

A composite frame may compose left-eye pixels (or left pixels) and right-eye pixels (or right pixels) based on a number of factors. For example, composite frames may compose left pixels and right pixels in such a way that during a time interval when a remainder portion of a previous composite frame and a new portion of a current composite frame are scanned at the same time, the remainder portion of the previous composite frame composes pixels of the same perspective as that of pixels in the new portion of the current composite frame.

In 3D display systems as described herein, illumination on the pixels in the display area may be set in such a way that only these pixels from the same perspective are illuminated in the aforementioned time interval. Correspondingly, one or more control signals may be sent to a shuttered glasses controller to cause the shuttered glasses to open for that perspective substantially for that entire time interval. Thus, in 3D display systems as described herein, a viewer is presented with image information of the same perspective at all times, or at substantially at all times.

Unlike other 3D display systems in which duty cycles of shuttered glasses are deliberately set to very narrow temporal windows in order to avoid crosstalk between consecutive frames of different perspectives, in 3D display systems that implement composite frame techniques as described herein, duty cycles of shuttered glasses are not required to be set to very narrow windows to avoid crosstalk, but may be relatively lengthened allowing more light to reach the eye.

Unlike other 3D display systems in which delays are deliberately inserted to avoid crosstalk between consecutive frames of different perspectives, in 3D display systems that implement composite frame techniques as described herein, delays may or may not be inserted between consecutive composite frames in accordance with embodiments of the present invention.

In some embodiments, mechanisms as described herein form a part of a display system, including but not limited to a television, set-top box, digital video recorder (DVR), a laptop computer, netbook computer, cellular radiotelephone, digital photo frame, electronic book reader, point of sale terminal, desktop computer, computer workstation, computer kiosk, and various other kinds of terminals and display units. A composite frame can be generated outside of a display rendering device, such as by a standalone set-top box, and the resulting bitstream transmitted to the display rendering device according to embodiments of present invention.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Image Data Comprising Frames of Single Perspectives

FIG. 1A illustrates example image data that comprises a sequence of left-eye frames (e.g., 104-1, 104-2, etc.) along a media time direction 102 and a sequence of right frames (e.g., 106-1, 106-2, etc.) along the same media time direction 102. As used herein, the term "media time" may refer to a media time point in a sequence of media time points that make up the total playing time of the image data. For example, if the image data represents a movie, a media time of the image data may be a media time point in the sequence of media time points that make up the two-hour playing time of the movie. While the image data may be played, paused, stopped, rewound, and fast-forwarded arbitrarily in real time, the total playing time, or the sequence of media time points, of the image data is an intrinsic property of the image data. As illustrated in FIG. 1A, the sequence of media time points comprises a plurality of media time points (e.g., 102-1, 102-2, etc.) along a media time direction such as 102. As used herein, the term "media time direction" refers to the particular direction along which the sequences of frames in the image data are to be normally played by a media player.

In some possible embodiments, each second of normal playing time of the image data may comprise 24 media time points (e.g., 102-1, 102-2, etc.). In some other embodiments, each second of the normal playing time may comprise a different number of media time points. At each media time point along the media time direction 102, there are (1) a left frame from the sequence of left frames, and (2) a corresponding right frame from the sequence of right frames, respectively for the left and right eyes of the view at that media time point. For example, as illustrated, at media time point 102-1, there are two frames: left frame 104-1 and right frame 106-1 in the image data.

In some possible embodiments as illustrated in FIG. 1B, the sequence of left-eye frames and the sequence of right frames may be provided in a single overall sequence of frames. A 3D display system as described herein is configured to determine, based on the image data, any individual left frame or right frame (e.g., 104-1, 106-1, etc.) therein.

3. Load-and-Hold Techniques

Figure 2A:
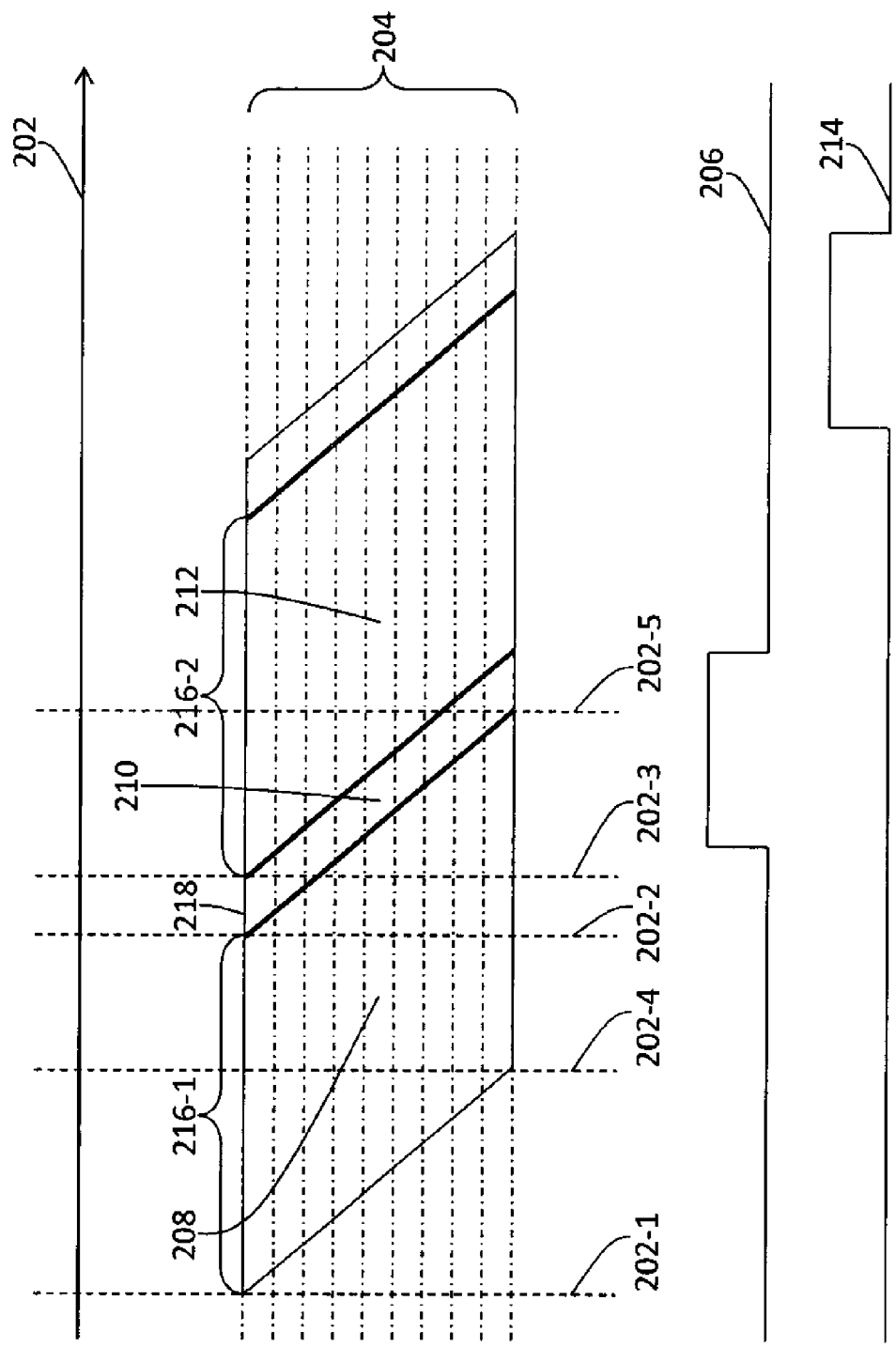
FIG. 2A illustrates an example operation of 3D LCD display systems that implement load-and-hold techniques.

FIG. 2A illustrates an example operation of 3D display systems that use load-and-hold techniques. In these 3D display systems, left and right frames, even sharing a same media time point, may be sequentially scanned either in horizontal segment blocks or individual lines and displayed along a system time direction 202. For example, at system time point 202-1, such a display system begins to load a first left-eye frame. This left frame may, for example, be frame 104-1 derived from the image data in FIG. 1A or FIG. 1B. At a subsequent system time point 202-2, the display system begins to load a first right frame. This first right frame may, for example, be frame 106-1 derived from the image data in FIG. 1A or FIG. 1B. In some possible embodiments, the first left frame and the first right frame (e.g., 104-1 and 106-1) here may correspond to a same media time point (e.g., 102-1). In some other embodiments, a left frame of a media time point may be rendered after a right frame of the same media time point. As used herein, a system time point refers to a runtime in a display system.

In sum, a 3D display system that implements the load-and-hold techniques may present a left frame of a media time point before presenting a right frame of the same media time point or may present a right frame of a media time point before presenting a left frame of the same media time point. As changes between intra-perspective frames are less drastic than changes between inter-perspective frames, and as a viewer's eyes typically retains visual memory for a duration greater than $1/24$ of a second, even if frames of the same media time points are played in different system time points, so long as left frames are directed to the left eye of the viewer, right frames are directed to the right eye, and a sufficient number of these frames are presented to the viewer per unit time, the viewer may perceive 3D displaying effects.

To present a frame, the display system may use a plurality of scan lines/segments 204, arrayed in a first spatial direction of a display panel, to scan frames into a display area of the display panel. Each of the scan lines 204 may be configured to scan in, along a second spatial direction of the display panel, a linear rectangular block of pixels of the frames. This linear rectangular block of pixels of the frames may share a same or similar location in a plurality of coordinate points along the first spatial direction.

The second spatial direction may, but is not limited to, be orthogonal to the first spatial direction. For example, the first spatial direction may be the top-to-bottom vertical direction of the display panel, while the second spatial direction may be the left-to-right horizontal direction of the display panel. A linear rectangular block of pixels of the frames scanned in a scan line may comprise one or more horizontal lines of pixels in the frames. The one or more horizontal lines of pixels in these frames are to be displayed to the viewer at a particular coordinate point along the vertical direction.

In FIG. 2A, from system time point 202-1 to system time point 202-4, the display system starts scanning (or loading) left frame 104-1 in all scan segments/lines 204 along the vertical direction. From system time point 202-2 to system time point 202-5, the display system finishes scanning left frame 104-1 in all the scan lines 204. From system time point 202-3, the display system starts scanning right frame 106-1 in a manner similar to that used for scanning left frame 104-1 as described. After the scanning of right frame 106-1, a second left frame, e.g., 104-2, is scanned in a manner similar to that used for scanning left frame 104-1 and right frame 106-1. This process continues until all left and right frames in the image data are scanned by the display system.

In such a display system, during a period from system time point 202-1 and system time point 202-5, as indicated by a parallelogram 208, the display panel shows a mixture of left frame 104-1 and a previous right frame, as the previous right frame is gradually being replaced by left frame 104-1 up to system time point 202-5. If a viewer's shuttered glasses are open for the left-eye perspective during that period, the viewer see partial imagery from the previous right frame as well as partial imagery from left frame 104-1. Thus, the viewer will see crosstalk between frames of different perspectives. Similarly, as indicated in a parallelogram 212, the display panel shows a mixture of right frame 106-1 and left frame 104-1 up to a system time point at the lower right corner of the parallelogram 212.

Consequently, in the display system under the load-and-hold techniques, a delay (or hold) interval may be inserted between consecutive frames of different perspectives. For example, a delay interval 218 from system time point 202-2 to system time point 202-3 may be inserted in a scan line such as the first scan line of the plurality of scan lines 204 between a scan line segment 216-1 for frame 104-1 and a scan line segment 216-2 for frame 106-1. The scanning of right frame 106-1 is not started in the first scan line until after the delay interval 218 following the completion of the scanning of left frame 104-1 in the first scan line. Similarly, for other scan lines in the plurality of scan lines 204, similar delay intervals may be inserted, thereby giving rise to a delay-time parallelogram 210.

As delay intervals as indicated in parallelogram 210 are inserted between scan line segments of consecutive frames, corresponding control signals may be sent to the viewer's shuttered glasses to open the left-eye perspective only for a time interval from system time point 202-5 to system time point 202-3, as indicated by a waveform 206 for the left-eye perspective of the shuttered glasses and another wave form 214 for the right-eye perspective of the shuttered glasses. In that time interval, except for perhaps some residual effect due to inherent response time of optical system involved, crosstalk between frames of different perspectives may or may not be significantly reduced depending on the length of the delay intervals inserted between the loadings of frames 104-1 and 106-1.

Such a display system still needs to minimize the scanning time from system time point 202-1 to system time point 202-5 to allow a sufficient number of frames presented to a viewer per unit time along the system time direction 202. At the same time, such a display system still needs to insert sufficient delay intervals between the scanning (or loading) of consecutive frames to give the viewer enough time to view each frame, in order to avoid a perception of significantly dimmed images by the viewer. Thus, such a system may be relatively expensive to implement and high performance in the system may be relatively difficult to achieve.

4. Composite Frames

Figure 2B:
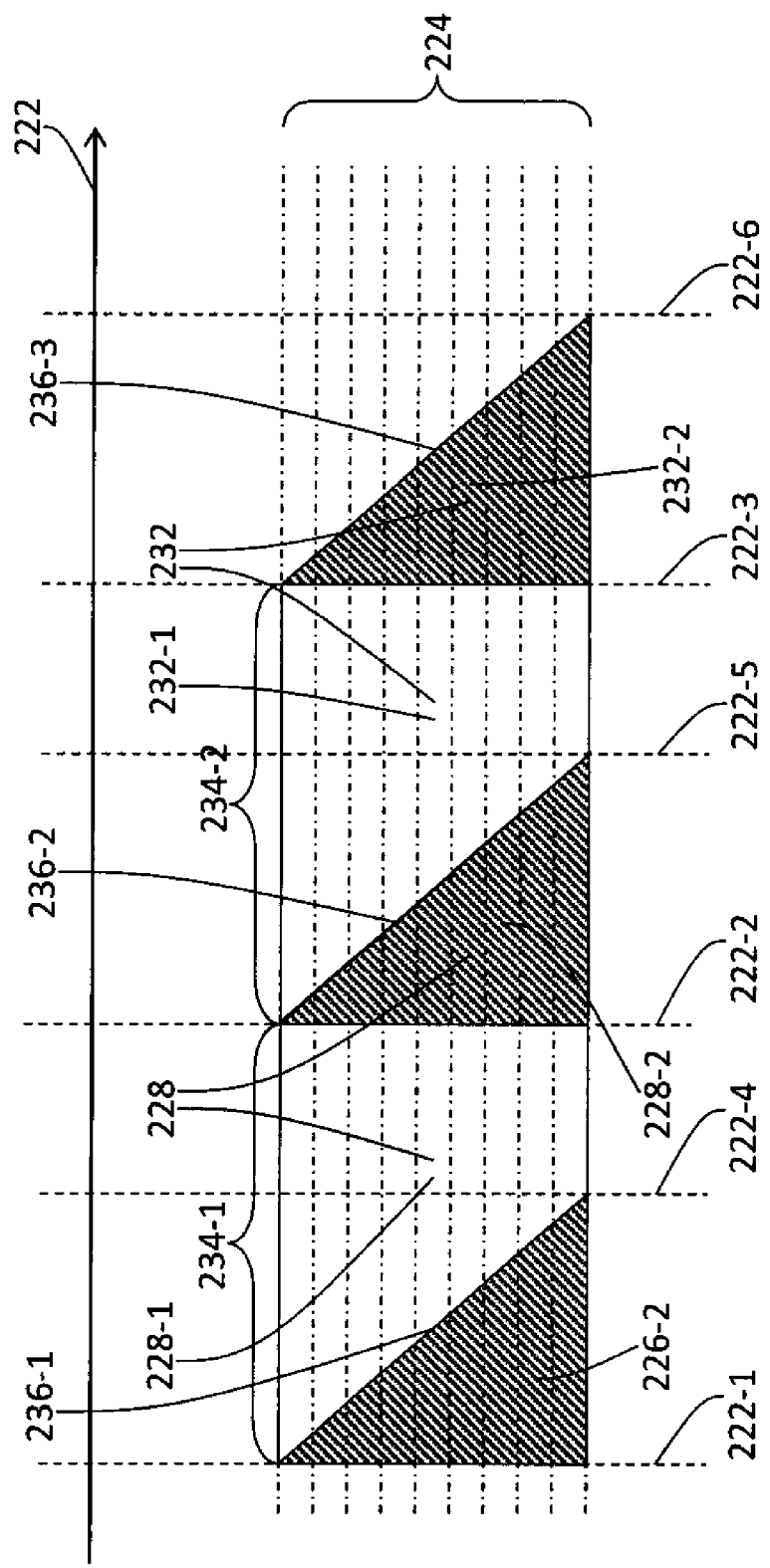

FIG. 2B illustrates example operation of 3D display systems that implement composite frame techniques and potentially scanning backlight to overcome the artifacts due to segment loading used in LCD displays. Under the composite frame techniques, instead of scanning simple frames with each frame comprising pixel values of a single perspective, composite frames with each frame comprising a mixture of pixel values from different perspectives may be scanned.

A composite frame is a frame that is neither a left frame nor a right frame, but instead comprises a mixture of left pixel values and right pixel values. As used herein, the term "left pixel values" refers to pixel values from a left frame, while the term "right pixel values" refers to pixel values from a right frame.

In some possible embodiments, the sequence of left frames and the sequence of right frames from the image data as illustrated in FIG. 1A and FIG. 1B may be converted into a sequence of a type-I composite frames and a sequence of a type-II composite frames.

In some possible embodiments, a type-I composite frame comprises an upper-left portion that is dominantly populated by left pixel values, while a type-II composite frame comprises an upper-left portion that is dominantly populated by right pixel values. In some other possible embodiments, different types of composite frames may be defined based on a different mixture of left pixel values and right pixel values.

In some possible embodiments, composite frames of two different types are sequentially presented in an interleaving manner along a system time direction (e.g., 222 of FIG. 2B and FIG. 2C). For example, as illustrated in FIG. 2B, the display system may start scanning a first type-I composite frame 228 at system time point 222-1, a first type-II composite frame 232 at system time point 222-2, a second type-I composite frame at system time point 222-3, a second type-II composite frame at a later system time point, and so on.

It should be noted that the first type-I composite frame as discussed above may or may not be the very first frame of the sequence of composite frames. In the present example, the first type-I composite frame may be preceded by a previous type-II composite frame. When no delay intervals are inserted in scan lines 224 between the previous type-II composite frame and the first type-I composite frame 228, the solid line 236-1 indicates the boundary between these composite frames. Similarly, the solid line 236-2 indicates the boundary between the first type-I composite frame 228 and the first type-II composite frame 232; the solid line 236-3 indicates the boundary between the first type-II composite frame 232 and the second type-I composite frame (not shown).

At system time point 222-1, the scan lines 224 have been scanned from the left direction of FIG. 2B up to the vertical time line indicated by system time point 222-1. However, a portion 226-2 of the previous type-II composite frame of the second type has not completed scanning at that point. At system time point 222-4, the portion 226-2 of the previous type-II composite frame completes scanning. At the same time, all the scan lines commence scanning for the first type-I composite frame 228. In some embodiments, the portion 226-2 comprises the same perspective type of pixel values as that of pixel values in the portion 228-1 of the first type-I composite frame 228. In the present example, the portion 226-2 comprises only left pixel values, as the portion 228-1 of the first type-I composite frame 228 comprises only left pixel values.

From system time point 222-4 to system time point 222-2, only pixel values in a portion 228-1 of the first type-I composite frame 228 are scanned. However, the scanning of all the pixel values for the first type-I composite frame 228 has not finished at system time point 222-2, and continues beyond system time point 222-2. At system time point 222-5, the remaining portion 228-2 of the first type-I composite frame 228 completes scanning. At the same time, all the scan lines commence scanning for the first type-II composite frame 232. In some possible embodiments, the portion 228-2 comprises the same type of pixel values as that of pixel values in the portion 232-1 of the first type-II composite frame 232, but different from that of pixel values in the portion 228-1. In the present example, the portion 228-2 comprises only right pixel values, as the portion 232-1 of the first type-II composite frame 232 comprises only right pixel values, while the portion 228-1 comprises only left pixel values.

From system time point 222-5 to system time point 222-3, only pixel values in a portion 232-1 of the first type-II composite frame 232 are scanned. However, the scanning of all the pixel values for the first type-II composite frame 232 has not finished at system time point 222-3, and continues beyond system time point 222-3. At system time point 222-6, the remaining portion 232-2 of the first type-II composite frame 232 completes scanning. At the same time, all the scan lines commence scanning for the second type-I composite frame. In some possible embodiments, the portion 232-2 comprises the same perspective type of pixel values as that of pixel values in the first portion of the next type-I composite frame (not shown), but different from that of pixel values in the portion 232-1. In the present example, the portion 232-2 comprises only left pixel values, as the first portion of the next type-I composite frame comprises only left pixel values, while the portion 232-1 comprises only right pixel values.

As can be seen from FIG. 2B, first, between system time 222-1 and system time 222-4, only left pixel values are scanned; second, between system time 222-2 and system time 222-5, only right pixel values are scanned; third, between system time 222-3 and system time 222-6, again only left pixel values are scanned; and so on.

In embodiments as illustrated in FIG. 2B, there is no delay inserted in scan lines 224 between consecutive frames. For example, in FIG. 2B, no delay is inserted between the segment 234-1 and 234-2 in the first of the scan lines 224. As soon as the segment 234-1 in the first of the scan lines 224 finishes scanning for frame 228, scanning of the following composite frame 232 in the same first of the scan lines 224 may commence.

In alternative embodiments as illustrated in FIG. 2C, delay intervals as indicated by segments of scan lines 224 in a parallelogram 230 may be inserted in scan lines 224 between consecutive frames. In those alternative embodiments, scanning of a type-I composite frame may or may not overlap with scanning of a type-II composite frame. For example, in FIG. 2C, a delay segment 236 is inserted between the segment 234-1 and 234-2 in the first of the scan lines 224. After the segment 234-1 in the first of the scan lines 224 finishes scanning for frame 228, scanning of the following composite frame 232 in the same first of the scan lines 224 may not start until at system time point 222-7 after the delay segment 236.

5. Time-Domain and Spatial-Domain Representations

In the time domain, a frame is represented by a parallelogram comprising a plurality of segments of the scan lines within the parallelogram while a system time point is represented by a vertical line. For example, in a time domain representation 302 of FIG. 3A, parallelogram 228 may represent a frame such as the first type-I composite frame discussed previously, while vertical lines 222-1 and 222-2 in the time domain representation 302 indicate two different system time points.

In the spatial domain, a composite frame may be loaded into a rectangular area of a display panel in a 3D display system as described herein. In the spatial domain, a system time point may be represented by a slanted line corresponding to spatial positions at which pixels are being scanned at the time corresponding to the system time point. For example, in a spatial domain representation 304 of FIG. 3A, composite frame 228 assumes a rectangular shape, while slanted lines 222-1 and 222-2 in the spatial representation 304 indicate system time points 222-1 and 222-2 (which in comparison are depicted as vertical lines in the time domain representation 302) in the spatial domain representation 304. The slanted line 222-2 in the spatial domain indicates spatial positions at which pixels are being scanned at the time corresponding to system time point 222-2 in the time domain representation 302.

Figure 3A:
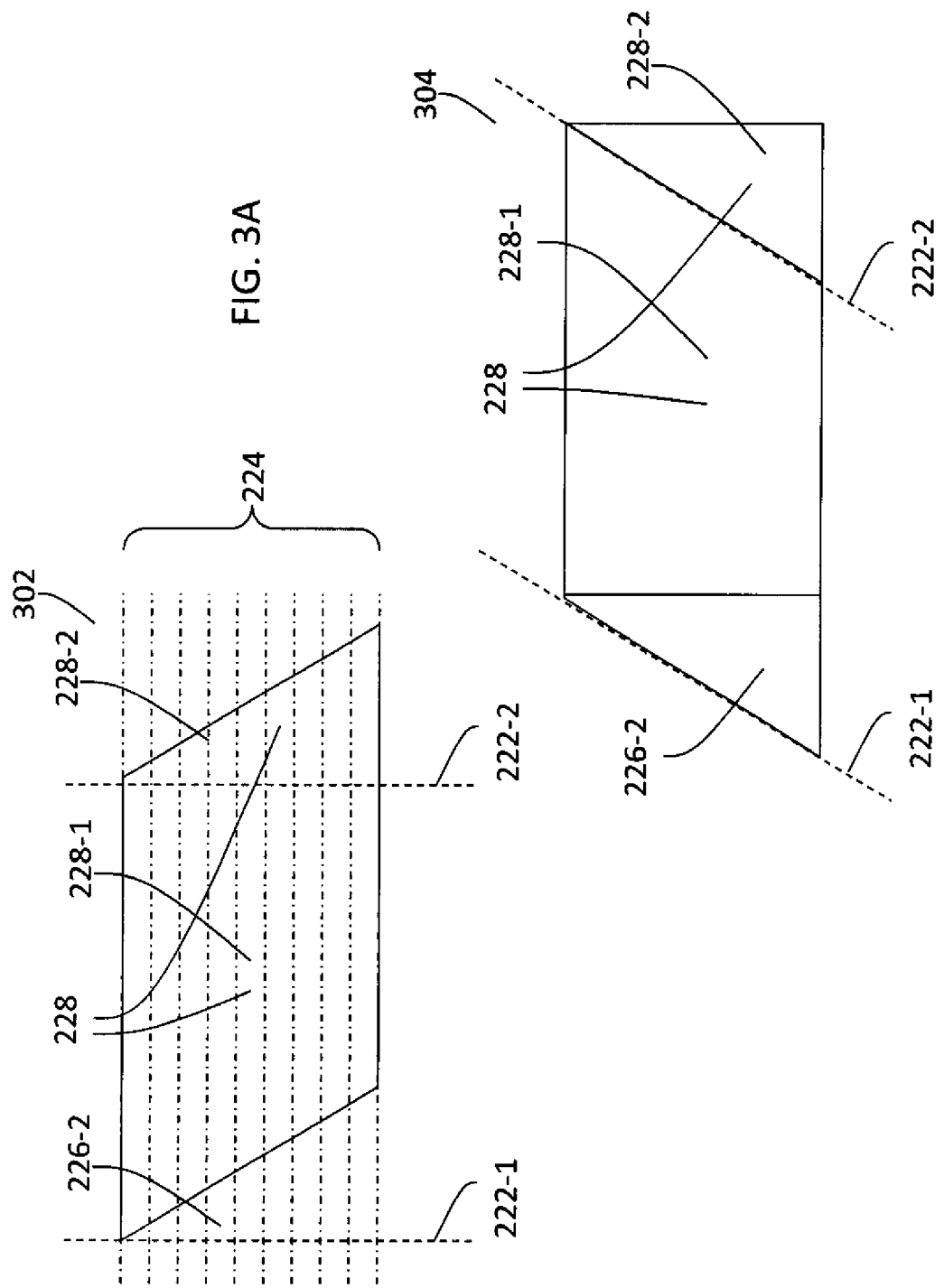
FIG. 3A illustrates example representations of a composite frame, according to possible embodiments of the present invention.

As each composite frame is loaded into a rectangular area of the display panel, the sequence of composite frames can be depicted as a sequence of rectangular shapes. For example, the portion 226-2 of the previous type-II composite frame as discussed earlier may be respectively represented by two triangular areas in the time domain representation and the spatial domain representation as shown in FIG. 3A. Similarly, the portion 228-1 of the first type-I composite frame as discussed earlier may be respectively represented by two trapezoidal areas in the time domain representation and the spatial domain representation as shown in FIG. 3A, the portion 228-2 of the first type-I composite frame as discussed earlier may be respectively represented by two triangular areas in the time domain representation and the spatial domain representation as shown in FIG. 3A. It should be noted that the same display area on the display panel is repetitively used for each of the composite frames. Consequently, in the illustrated embodiment, each rectangular shape of a composite frame in the spatial domain representation 304 maps to the same rectangular display area of the display panel. Thus, the triangular area 226-2 of the previous type-II composite frame in the spatial domain representation 304 and the triangular area 228-2 of the first type-I composite frame in the spatial domain representation 304 map to a same portion of the display area on the display panel. However, it should be noted that the scanning of the same pixels in the display area occurs at a different time for different pixel values in a different composite frame.

To illustrate a clear example, a rectangular area of the display panel is used to scan in frames. In other possible embodiments, a different geometric shape may be used for a display area of the display panel to scan in frames. In those other possible embodiments, relationships between a time domain representation and a spatial domain representation of frames may be similarly ascertained.

6. Example Composite Frames

Figure 3B:
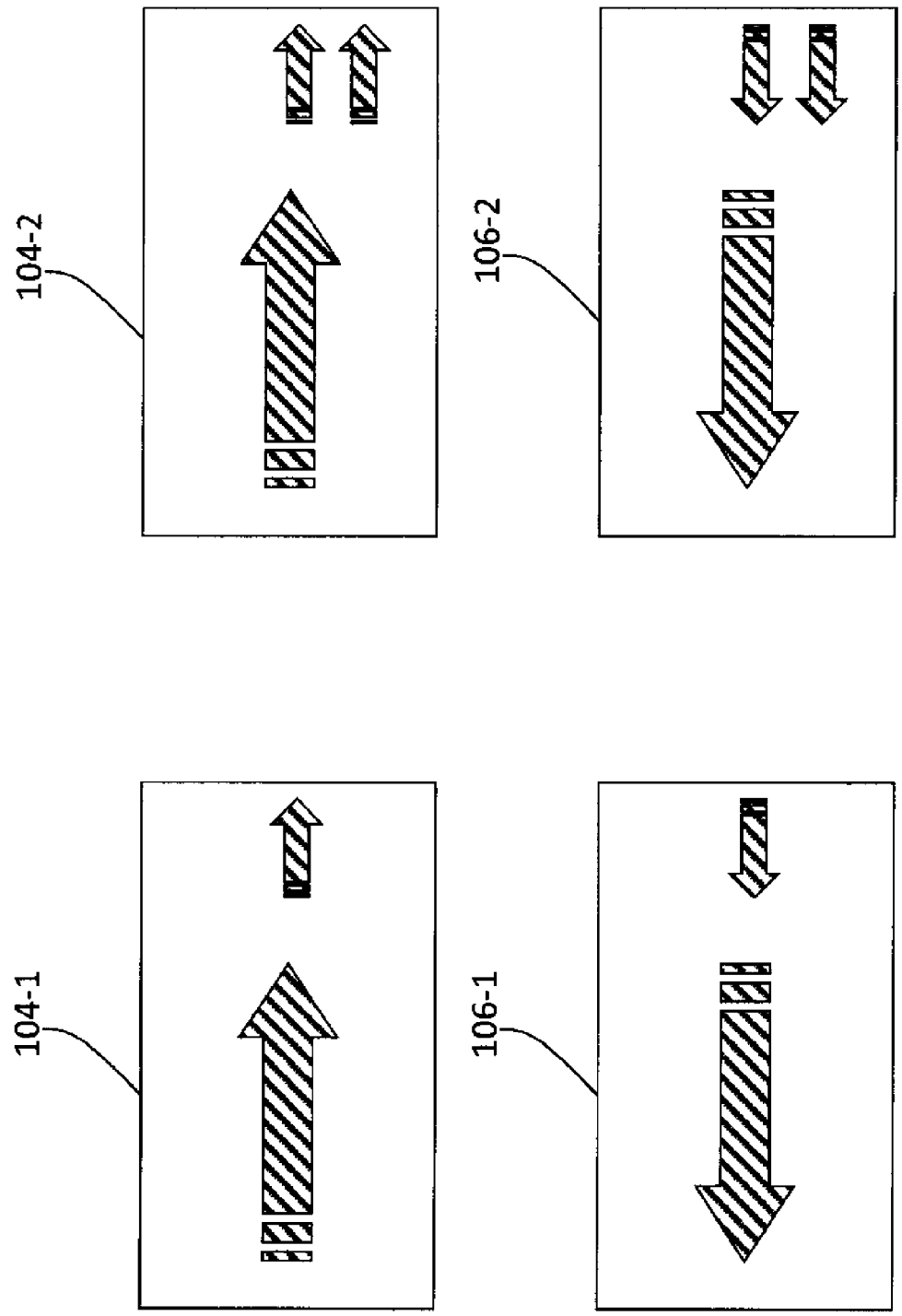
FIG. 3B illustrates example frames of single perspectives, according to possible embodiments of the present invention.

FIG. 3B shows example images that may be contained in left frames 104-1 and 104-2 and right frames 106-1 and 106-2. It should be noted that the images in the frames are for illustration purposes only.

Figure 3C:
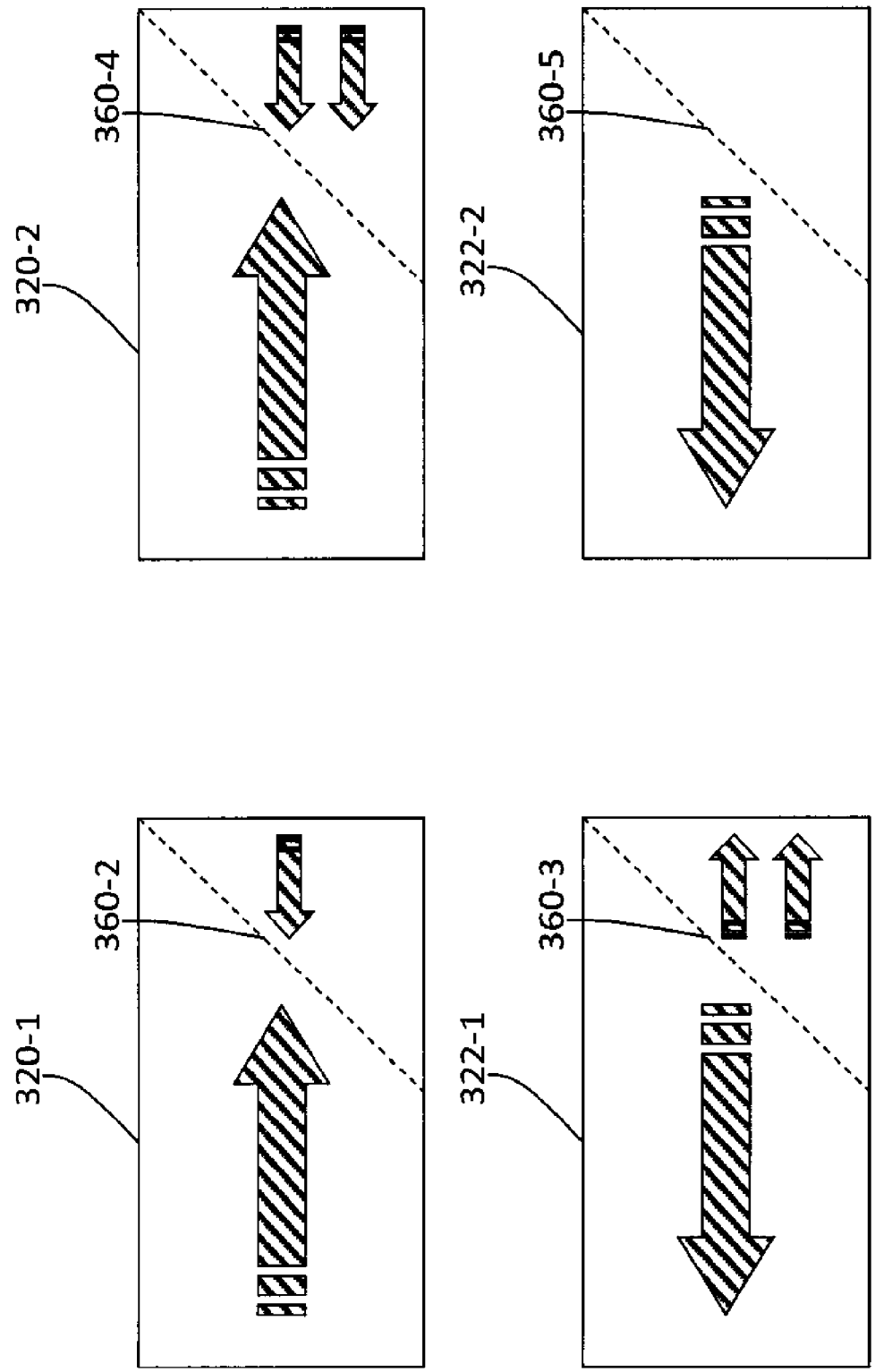
FIG. 3C illustrates example composite frames of mixed perspectives, according to possible embodiments of the present invention.

FIG. 3C shows example composite frames that are constructed from example left frames and right frames. A composite frame 320-1 may be a type-I composite frame such as the first type-I composite frame 228 discussed previously. The composite frame 320-1 comprises a part from left frame 104-1 on the upper-left-hand side of the broken slanted line 360-2 (which is not a part of the image) and a part from right frame 106-1 on the lower-right-hand side of the same broken slanted line 360-2. A composite frame 322-1 may be a type-II composite frame such as the first type-II composite frame 232 discussed previously. The composite frame 322-1 comprises a part from right frame 106-1 on the upper-left-hand side of the broken slanted line 360-3 (which is not a part of the image) and a part from right frame 104-2 on the lower-right-hand side of the same broken slanted line 360-3.

Similarly, a composite frame 320-2 may be a type-I composite frame such as the type-I composite frame 228 following the first type-II composite frame 232 discussed previously. The composite frame 320-2 comprises a part from left frame 104-2 on the upper-left-hand side of the broken slanted line 360-4 (which is not a part of the image) and a part from right frame 106-2 on the lower-right-hand side of the same broken slanted line 360-4. A composite frame 322-2 may be a type-II composite frame right after the type-I composite frame 320-2. The composite frame 322-2 comprises a part from right frame 106-2 on the upper-left-hand side of the broken slanted line 360-5 (which is not a part of the image) and a part from a right frame (not shown) on the lower-right-hand side of the same broken slanted line 360-5.

In some possible embodiments, a composite frame of the first type such as 228 comprises two portions such as 228-1 and 228-2, each comprising pixels from frames of different perspectives. For example, the portion 228-1 may comprise a subset of left pixel values from left frame 104-1, while the portion 228-2 may comprise a subset of right pixel values from right frame 106-1.

In sum, a composite frame comprises two portions each comprising pixel values from frames of different perspectives. For example, the upper-left portion of composite frame 320-1 may comprise a subset of left pixel values from left frame 104-1, while the lower-right portion of the same composite frame 320-1 may comprise a subset of right pixel values from right frame 106-1.

In some possible embodiments, left pixel values scanned in a previous type-II composite frame and left pixel values in a current type-I composite frame are different complementary parts of the same left frame, while right pixel values scanned in a previous type-I composite frame and right pixel values in a current type-II composite frame are different complementary parts of the same right frame. Take, for example, composite frame 320-2 as the current composite frame. Composite frame 322-1 is the previous composite frame to this current composite frame. As can be seen in FIG. 3C, left pixel values in the upper-left side of the current composite frame 320-2, depicting a large arrow pointing from left to right, and left pixel values in lower-right side of the previous composite frame 322-1, depicting two smaller arrows pointing from left to right, are different complementary parts of the same left frame 104-2.

Similarly, take, for example, composite frame 322-1 as the current composite frame. Composite frame 320-1 is the previous composite frame to this current composite frame. As can be seen in FIG. 3C, right pixel values in the upper-left side of the current composite frame 322-1, depicting a large arrow pointing from right to left, and right pixel values in lower-right side of the previous composite frame 320-1, depicting two smaller arrows pointing from right to left, are different complementary part of the same right frame 106-1.

Thus, under 3D displaying techniques as described herein, sequences of frames of a single perspective are converted by display systems described herein into sequences of composite frames. Using composite frames, a frame of a particular perspective is loaded in two consecutive composite frames. A subset of pixel values in the frame of the particular perspective is loaded first, while the remainder subset of pixel values in the frame of the particular perspective is loaded next.

Figure 3D:
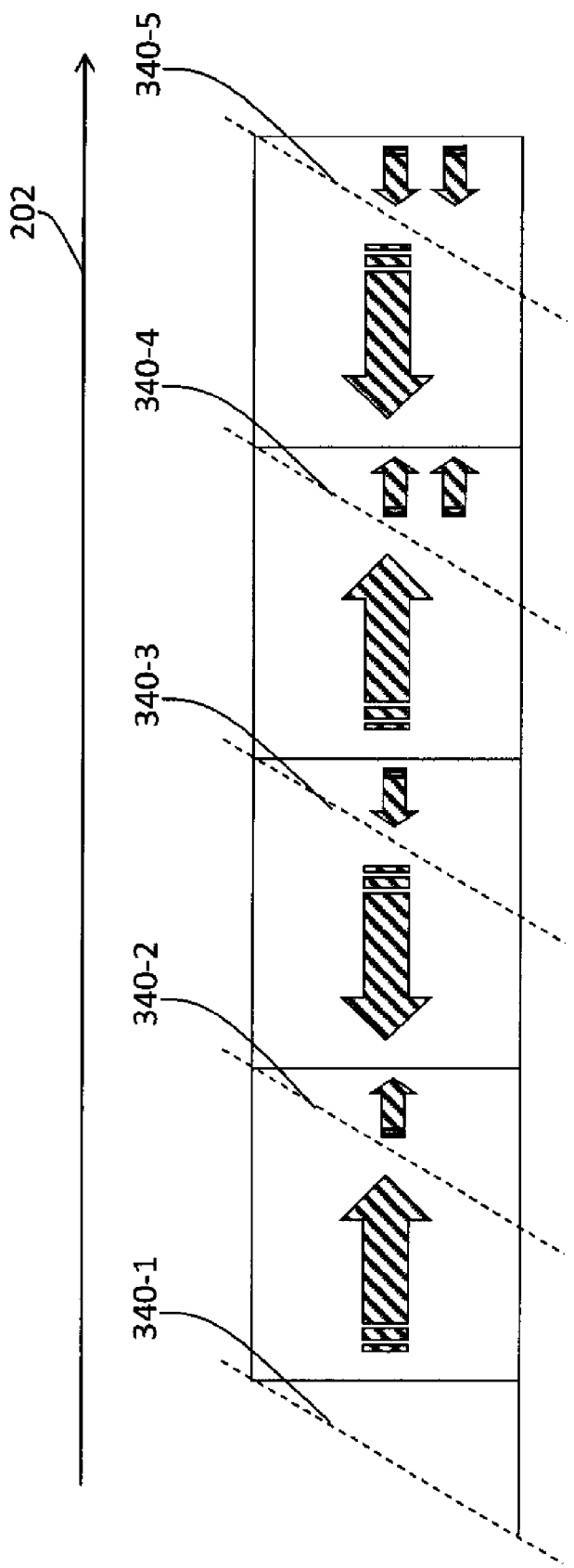
FIG. 3D illustrates an example of playing a sequence of frames of single perspective.

FIG. 3D illustrates a sequence of frames of a single perspective played under the load-and-hold techniques. As can be seen, during any two consecutive system time points (any consecutive two of 340-1 through 340-5) at which frames start scanning, pixel values from a previous frame of a different single perspective are still being scanned along with the current frame, resulting in crosstalk between frames of opposite perspectives. Thus, under these techniques, delays are inserted between consecutive frames in order to reduce the crosstalk.

Figure 3E:
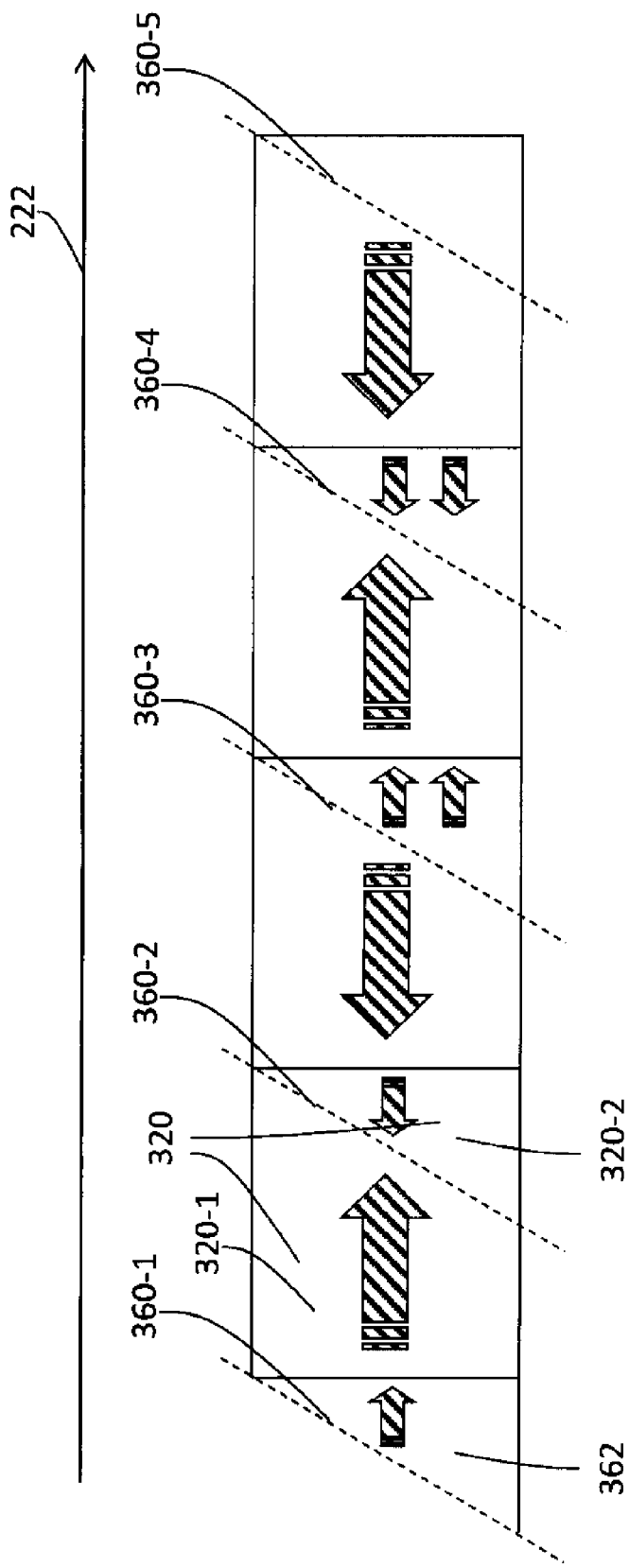
FIG. 3E illustrates an example of playing a sequence of composite frames of mixed perspectives, according to possible embodiments of the present invention.

FIG. 3E illustrates a sequence of composite frames of a mixed perspective played under the composite frame techniques. As can be seen, during any two consecutive system time points (any consecutive two of 360-1 through 360-5) at which consecutive composite frames respectively start scanning, pixel values from a portion of a previous composite frame of a perspective are scanned along with pixel values from a portion of a current composite frame of the same perspective, resulting in no crosstalk between pixel values of opposite perspectives. Thus, under these techniques, delays may or may not be inserted between consecutive frames. It should be noted that portions 362 and 320-2, which are in two different composite frames, occupy the same display portion on the display panel. The pixel values in the portion 362 are physically in the lower-right side of the display panel; and these pixel values and the pixel values in the upper-left side portion 320-1 of composite frame 320 form all the pixel values for left frame 114-1 in a scanning interval between system time point 360-1 and system time point 360-2.

7. Example Illumination

For the viewer to perceive a pixel value on a display panel under composite frame techniques as described herein, not only does a correct pixel value based on the image data need to be loaded in a pixel of a display panel, but also the pixel needs to be illuminated for a certain duration of time. In some possible embodiments, pixels may be self-illuminated, for example, using pixels that are based on organic light emitting diode (OLED). In some other possible embodiments, pixels (e.g., LCD pixels) may be illuminated by an external light source, for example, using a backlight unit (BLU) or a front projected external light source.

In some possible embodiments, a display control mechanism, which is a part of a 3D display system described herein, scans frames by loading pixel values of composite frames from the image data to pixels on the display panel in a sequential order, while a scanning backlight or other illumination control mechanism, which is also a part of the 3D display system described herein, causes different pixels in a composite frame to illuminate for a substantially uniform duration of time.

In some possible embodiments, different pixels loaded with different pixel values of a composite frame may be illuminated at different times for the substantially uniform duration of time.

FIG. 4A illustrates how an illumination control mechanism works relative to a composite frame such as the type-I composite frame 228 discussed earlier. The scanning of the composite frame 228 starts at system time point 222-1, which is indicated as a slanted broken line 420 in a spatial domain representation of FIG. 4A. For the purpose of illustration, slanted broken lines indicated in the spatial domain representation of FIG. 4A have been mapped to points on the system time axis 222. Each of the slanted broken lines in the spatial representation of FIG. 4A not only may be mapped to a particular system time point on the system time axis 222, but also indicates positions on the display panel at which positions pixels are being scanned at the particular system time point. Indeed, a current slanted line in the spatial domain representation is continually advancing from left to right as the sequence of composite frames is being scanned. As used herein, the term "current slanted line in the spatial domain representation," or simply "current slanted line," refers to a line formed by positions of pixels that are being currently scanned with pixels values of the composite frames corresponding to the same positions.

In some possible embodiments, no illumination is provided to any pixels loaded with pixel values of composite frame 228 and the portion 226-2 until a system time point 408, at which time pixels with pixel values of composite frame 228 and the portion 226-2 within a band 406 are illuminated to a desired luminance level. In some possible embodiments, the illumination of these pixels within the band 406 may be caused with driving a suitable electric signal to each of the pixels, for example, when the pixels are OLED pixels. In some alternative possible embodiments, the illumination of these pixels within the band 406 may be caused by controlling an external light source to only illuminate the pixels within the band 406. In some possible embodiments, there exists a gap between the left edge (e.g., as indicated by 402 when the current slanted line is at system time point 408) and the current slanted line (i.e., 408 in the present example). In alternative possible embodiments (not shown in FIG. 4A), there exists no gap between the left edge of the band 406 and the current slanted line; and thus the left edge and the current slanted line coincide (e.g., the left edge 402 and the slanted line 408 would coincide when the slanted line 408 is the current slanted line in those alternative possible embodiments).

In some possible embodiments, as the aforementioned current slanted line (i.e., a current system time point) formed by pixels currently being scanned continually advances from left to right, the band 406 moves at the same rate from left to right, and any pixel that falls within the band 406 is illuminated.

At a certain current system time point 412, the band 406 may reach the slanted line corresponding to system time point 222-2, and the right edge of the band 406 is at a slanted line indicated by a system time point 410. In some possible embodiments, starting at system time point 412, the band 406 becomes stationary for certain duration. This duration may correspond to a difference in time between system time 410 and system time 222-2 and substantially the same as a difference in time between system time point 222-1 and system time point 402.

Thus, in these embodiments, a pixel is illuminated in the band 406 for a certain duration that is substantially the same for all other pixels.

To illustrate a clear example, the width of the band 406 has been described as a constant. In other possible embodiments, the width of the band 406 may experience a waxing phase initially and a waning phase at the end. In those other possible embodiments, for example, right after system time point 408, the width of the band 406 may increase to a certain point before the trailing left slanted line (which initially may be the left slanted line 420 at the system time point 408) of the band 406 starts moving from left to right at the same rate as the current slanted line (which initially may be the right slanted line 402 at the system time point 408) moves from left to right. When the leading right slanted line of the band 406 reaches and stops at the slanted line 422 scanned at system time point 222-2, the trailing left slanted line (which at that point may be the left slanted line 410) of the band 406 does not become stationary but continues to move to right until the band 406 is substantially the same width as the initial width (a time difference between system time point 402 and system time point 222-1).

In some possible embodiments, while pixels in the band 406 are illuminated, pixels outside the band 406 remain unilluminated. Thus, even if the pixels to the right of the current slanted line may have old pixel values, the viewer does not perceive these pixels with the old pixel values. Therefore, under composite frame techniques described herein, duty cycles for shuttered glasses may be set to cover an entire duration in which the band 406 moves from a position corresponding to pixels scanned at system time point 222-1 to another position corresponding to pixels scanned at system time point 222-2. In some possible embodiments, a maximum width of the band 406 determines how long a pixel is illuminated. In some possible embodiments, this maximum width may be half of the time it takes to scan a composite frame. In some other possible embodiments, this maximum width may be longer than half of the time it takes to scan a composite frame; for example, a suitable delay may be inserted between two consecutive composite frames. In other possible embodiments, this maximum width may be shorter than half of the time it takes to scan a composite frame. Notably, since the combined duty cycles of the shuttered glasses for both left and right-eye perspectives may extend to cover the entire system time line, no waste is incurred for the light that is used to illuminate the pixels. At any given time, pixels that are being illuminated may be viewed by the viewer in a correct perspective.

8. Example Coordination with Shuttered Glasses

FIG. 4B illustrates an example operation of a 3D composite frame display system in the time domain with example waveforms for the viewer's shuttered glasses open-close state. For example, when illumination starts to be provided to pixels with left pixel values in the display panel at system time point 408 as illustrated in FIG. 4A and FIG. 4B, the 3D composite frame display system (or a shuttered glasses control mechanism therein) may send a wired or wireless control signal to the shuttered glasses to cause the latter to turn on the left-eye perspective at system time point 408. In some possible embodiments, at the same time or at a time prior to system time point 408, the 3D composite frame display system may send a wired or wireless control signal to the shuttered glasses to cause the latter to turn off the right-eye perspective. In a particular possible embodiment, only one control signal is sent to the shuttered glasses, and this one control signal turns on the left-eye perspective and turns off the right-eye perspective at substantially the same time, as illustrated by a waveform 414 for the left-eye perspective of the shuttered glasses and a waveform 416 for the right-eye perspective of the shuttered glasses. Similarly, when illumination starts to be provided to pixels with right pixel values in the display panel at system time point 412 as illustrated in FIG. 4A and FIG. 4B, the 3D composite frame display system may send another wired or wireless control signal to the shuttered glasses to cause the latter to turn on the right-eye perspective at system time point 412. In some possible embodiments, at the same time or at a time prior to system time point 412, the 3D composite frame display system may send a wired or wireless control signal to the shuttered glasses to cause the latter to turn off the left-eye perspective. In a particular possible embodiment, only one control signal is sent to the shuttered glasses, and this one control signal turns on the right-eye perspective and turns off the left-eye perspective at substantially the same time.

9. Example System Architectures

Figure 5A:
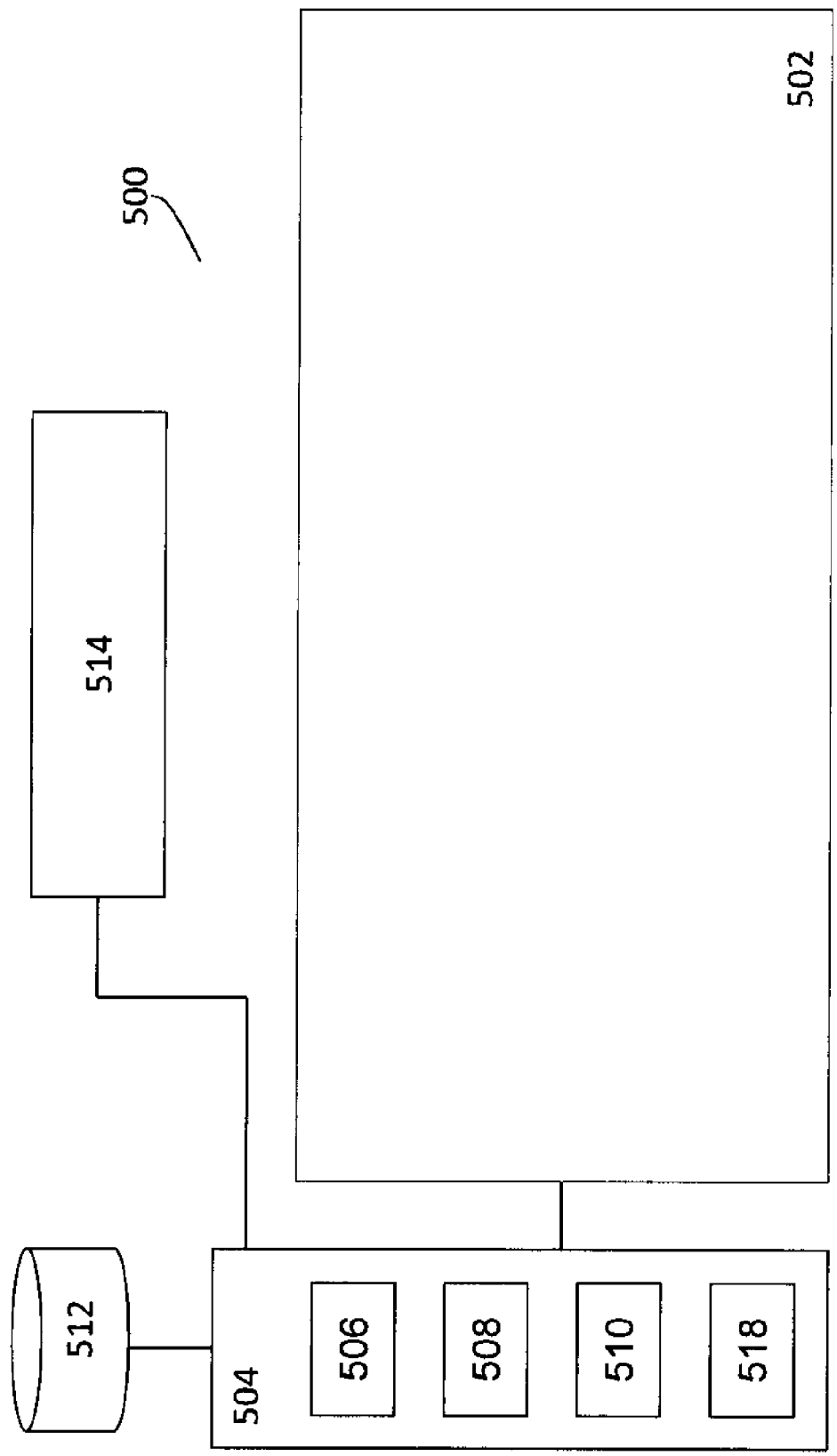

FIG. 5A illustrates an example block diagram for an example 3D display system 500 that uses composite frame techniques described herein. In some possible embodiments, display system 500 comprises a display panel 502, a system control mechanism 504, an image data source 512, and shuttered glasses controller 514 for a viewer, as previously discussed. In some possible embodiments, display panel 502 may be an LCD display panel or an OLED display panel or another suitable display panel.

System control mechanism 504 may be operatively coupled to display panel 502 and shuttered glasses controller 514. System control mechanism 504 may comprise an image data acquisition and conversion mechanism 506, a shuttered glasses control mechanism 508, a pixel or segment scanning/loading-hold mechanism 510, and an illumination control mechanism 518. System control mechanism 504, or the shuttered glasses control mechanism 508 therein, may be configured to control the shuttered glasses through shuttered glasses controller 514. For example, to cause the shuttered glasses 1) to fully close, 2) to open for a particular perspective only, or 3) to open for both perspectives, shuttered glasses control mechanism 508 may send a signal corresponding to an action that shuttered glasses controller 514 is to take. This signal may be an electronic message, and may be delivered wirelessly (Bluetooth, radio, infrared, etc.) or over a wired connection.

System control mechanism 504, or image data acquisition and conversion mechanism 506 therein, is operatively coupled with an image data source 512 and is configured to receive image data described herein from the image data source 512. The image data may be provided by the image data source 512 in a variety of ways including from over-the-air broadcast, a set-top box, a networked server coupled to the display system, and/or a storage medium. The image data may comprise frames of single perspectives as shown in FIG. 3A or, alternatively, already as composite frames according to the present invention. The image data acquisition and conversion mechanism 506 may convert the frames of single perspectives such as shown in FIG. 3A to composite frames with mixed perspectives such as shown in FIG. 3B. It should be appreciated that image data from image data source 512 may be provided in any 3D format, including without limitation, side-by-side (SBS), checkerboard (CB, quincunx), above-under, horizontal line interlaced, and 2D image with depth map. System control mechanism 504 can transform image data, in some cases using additional memory buffering, into composite frames. In some possible embodiments, display system control mechanism 504 may determine a scanning rate (R pixels/unit time) at which pixels are scanned in a scan line such as one of the scan lines 224 as previously discussed. Display system control mechanism 504 may also determine a time interval ($\Delta t$ unit time) between a first time at which scanning in a scan line for a composite frame begins and a second time at which scanning in an adjacent scan line for the composite frame begins. Based on this time interval $\Delta t$ (between two adjacent scan lines) and the scanning rate R (within a scan line), display system control mechanism 504 may determine, for each scan line segment in a composite frame, how many pixel values from a left frame corresponding to the same vertical position as that of the scan line should be included, and how many pixel values from a right frame corresponding to the same vertical position as that of the scan line should be included.

For example, in some possible embodiments, the first scan line segment in a composite frame such as 232 may comprise right pixel values all from a right frame such as 106-1, which may number to N pixel values. For the next scan line segment in the composite frame 232, a first number, equaling to $R \times \Delta t$, of left pixel values from a left frame 104-2 may be included, while a second number, equaling to $N-R \times \Delta t$, of right pixel values from right frame 106-1 may be included. In some embodiments, the first number of left pixel values (i.e., from left frame 104-2) is derived from the rightmost pixel values, in left frame 104-2, with a vertical position corresponding to the second scan line segment, while the second number of right pixel values (i.e., from right frame 106-1) is derived from the leftmost pixel values, in right frame 106-1, with the same vertical position corresponding to the second scan line segment. The third scan line segment may be similarly configured and may comprise $2 \times R \times \Delta t$, of left pixel values from left frame 104-2, and $N-2 \times R \times \Delta t$, of right pixel values from right frame 106-1. The i-th scan line segment may comprise $i \times R \times \Delta t$, of left pixel values from left frame 104-2, and $N-i \times R \times \Delta t$, of right pixel values from right frame 106-1. In some possible embodiments, the scanning rate within a scan line segment is configured in such a way as to ensure $N-M \times R \times \Delta t > 0$, where M is the total number of scan line segments in a composite frame.

Similarly, in some possible embodiments, the first scan line segment in a composite frame such as 228 may comprise left pixel values all from a left frame such as 104-1, which may number to N pixel values. For the next scan line segment in the composite frame 228, a third number, equaling to $R \times \Delta t$, of right pixel values from a right frame 106-1 may be included, while a fourth number, equaling to $N-R \times \Delta t$, of left pixel values from left frame 104-1 may be included. In some embodiments, the third number of right pixel values (i.e., from right frame 106-1) is derived from the rightmost pixel values, in right frame 106-1, with a vertical position corresponding to the second scan line segment, while the fourth number of left pixel values (i.e., from left frame 104-1) is derived from the leftmost pixel values, in left frame 104-1, with the same vertical position corresponding to the second scan line segment. The third scan line segment may be similarly configured and may comprise $2 \times R \times \Delta t$, of right pixel values from right frame 106-1, and $N-2 \times R \times \Delta t$, of left pixel values from left frame 104-1. The i-th scan line segment may comprise $i \times R \times \Delta t$, of right pixel values from right frame 106-1, and $N-i \times R \times \Delta t$, of left pixel values from left frame 104-1.

Based on the composite frames created by the image acquisition and conversion mechanism 506, the pixel scanning mechanism 510 loads or scans pixel values in the composite frames onto the pixels in the display panel 502. In some possible embodiments, the pixel scanning mechanism 510 scans composite frames using scan lines 224 as illustrated in FIG. 2B and FIG. 2C. It is not critical whether a pixel in the display panel 502 is made using LCD technologies, OLED technologies, or other pixel technologies, so long as such a pixel is configured with electronic circuit elements that accept a pixel value from the pixel scanning mechanism 510.

As the pixel scanning mechanism 510 continually scans composite frames into the display panel 502, the illumination control mechanism 518 works conjunctively to provide illumination to pixels as illustrated in FIG. 4A.

In some possible embodiments, illumination may be provided by the pixels or within the display panel 502 as illustrated in FIG. 5A. In some other possible embodiments, illumination may be provided by an external light source (e.g., 516) that is not a part of the display panel 502, as illustrated in FIG. 5B.

10. Example Process Flow

Figure 6:
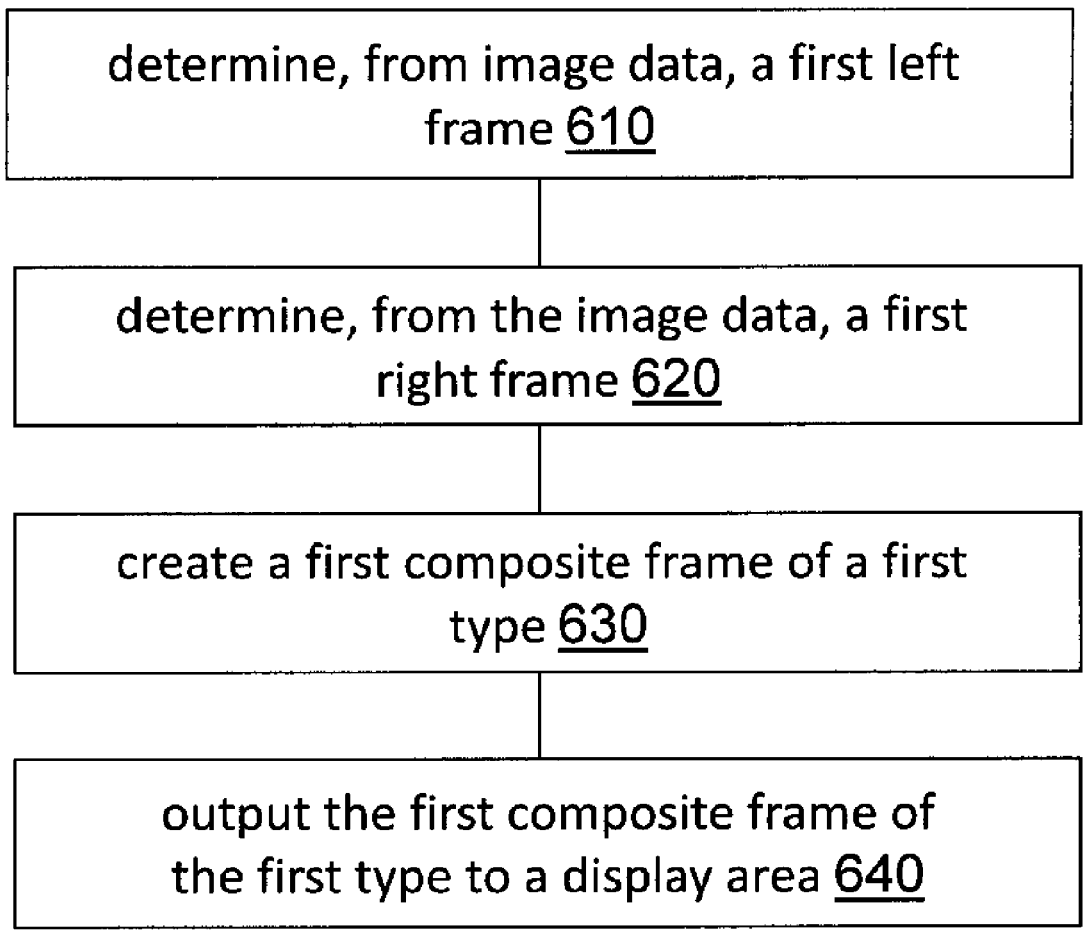
FIG. 6 illustrates an example process flow, according to a possible embodiment of the present invention.

FIG. 6 illustrates an example process flow according to a possible embodiment of the present invention. In some possible embodiments, one or more computing devices or components in a display system 500, or system control mechanism 504 therein, may perform this process flow. In block 610, the display system 500 determines, from image data, a first left frame (e.g., 104-1 of FIG. 1A or FIG. 1B). In block 620, the display system 500 determines, from the image data, a first right frame (e.g., 106-1 of FIG. 1A or FIG. 1B).

In block 630, based on the first left frame and the first right frame, the display system 500 creates a first composite frame of a first type, which, for example, may be the first type-I composite frame 228 as previously discussed. This first composite frame of the first type comprises a first plurality of scan line segments, for example, within the composite frame 228, as illustrated in FIGS. 2B and 2C. These scan line segments start scanning in a time sequential order along a first spatial dimension (e.g., along a vertical direction) of a display area (e.g., on the panel 502). In some possible embodiments, each pixel in the display area may be configured with switching element and other electric elements. The switching element and electric elements can be driven by the pixel scanning mechanism 510 based on a pixel value to place the pixel in a desired display state. Each of the first plurality of scan line segments may scan along a second spatial dimension (e.g., a horizontal direction) of the display area. Here, at least one in the first plurality of scan line segments comprises (or scans) one or more left pixel values in the first left frame 104-1 and one or more right pixel values in the first right frame 106-1.

In block 640, the display system 500 outputs the first composite frame of the first type to the display area on the display panel 502. Here, the term "output" means that a composite frame is loaded or scanned into pixels in the display area on the display panel 502.

The display system 500 may illuminate, for a duration of time in a first interval, each pixel in the display area that is loaded with (1) one of the one or more left pixel values of the first left frame that are in the first composite frame of the first type and (2) one of one or more other left pixel values from a previous left frame that are in a previous composite frame of a second type. Pixels may be self-illuminated or externally illuminated depending on the type of pixel. The display control mechanism 504 outputs a first control signal to cause shuttered glasses to open for a left-eye perspective substantially for the first interval.

Steps similar to the foregoing steps may be performed relating to a composite frame of a second type, such as the first type-II composite frame 232 of FIG. 2B or FIG. 2C.

This process may be repeated so that all, or a portion of, the content in the image data is presented to the viewer in a time-sequential manner.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
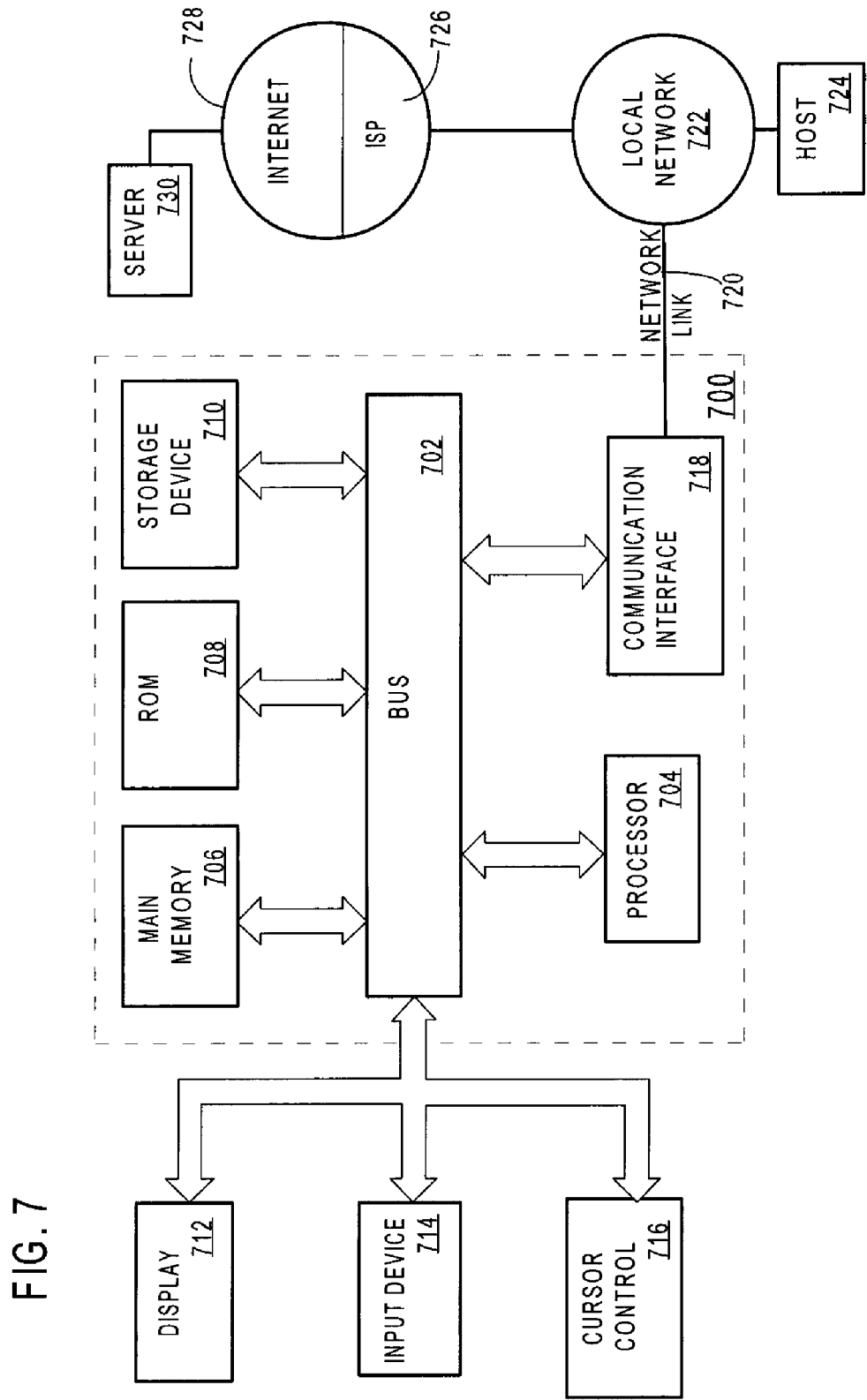
FIG. 7 illustrates an example hardware platform on which a computer or a computing device as described herein may be implemented, according a possible embodiment of the present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

12. Equivalents, Extensions, Alternatives and Miscellaneous

To illustrate a clear example, a 3D display system illustrated in FIG. 5A and FIG. 5B comprises a system control mechanism that comprises an image data acquisition and conversion mechanism. It should be noted that this is for illustration purposes only. In other embodiments, the image data acquisition and conversion mechanism may be implemented in an external image data acquisition and conversion system such as a settop box outside of the 3D display system. The image data illustrated in FIG. 1A and FIG. 1B may be converted into composite frames by the external system before the composite frames are provided to the 3D display system. The external system may be operatively linked to the 3D display system. Additionally and/or alternatively, the external system may determine the configuration and capability of the 3D display system by communicating with the system control mechanism of the 3D display system, in order to generate composite frames that can be properly displayed in the 3D display system.

To illustrate a clear example, transitions between open and close states of the shuttered glasses have been illustrated as having step transitions, for example, in FIG. 4B. In various embodiments, the shuttered glasses may comprise a slower response material for transitioning between open and close states. For example, the shuttered glasses may be LCD based and exhibit slower transition than the step transmissions depicted in FIG. 4B.

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method of three-dimensional imaging comprising:
   determining, from image data, a first left-eye frame corresponding to a first media time, wherein the first left-eye frame is among a sequence of left-eye frames respectively corresponding to a sequence of media times;
   determining, from the image data, a first right-eye frame corresponding to the first media time, wherein the first right-eye frame is among a sequence of right-eye frames respectively corresponding to the sequence of media times;
   creating a first composite frame of a first type, the first composite frame of the first type comprising an upper-left portion of left pixel values from an upper-left portion of the first left-eye frame and a lower-right portion of right pixel values from a lower-right portion of the first right-eye frame;
   wherein the first composite frame of the first type comprises scan lines each of which comprises both left and right pixel values;
   outputting the first composite frame of the first type to a display area;
   determining, from the image data, a second left-eye frame corresponding to a second media time, wherein the second left-eye frame is among the sequence of left-eye frames, and wherein the second media time immediately follows the first media time;
   creating a first composite frame of a second type, the first composite frame of the second type comprising an upper-left portion of right pixel values from an upper-left portion of the first right-eye frame and a lower-right portion of left pixel values from a lower-right portion of the second left-eye frame;
   wherein the first composite frame of the second type comprises scan lines each of which comprises both left and right pixel values; and
   outputting the first composite frame of the second type, subsequent in time to the first composite frame of the first type, to the display area;
   wherein the method is performed by one or more computing devices.

2. The method of claim 1, wherein the lower-right portion of right-eye pixel values from the first composite frame of the first type and the upper-left portion of right pixel values from the first composite frame of the second type are complementary parts of the first right-eye frame.

3. The method of claim 1, further comprising:
   illuminating, for a duration of time within a first interval, each pixel in the display area that is loaded with one (1) of one or more pixel values from the upper-left portion of left pixel values from the upper-left portion of the first left-eye frame that are in the first composite frame of the first type, or (2) of one or more pixel values from a lower-right portion of left pixel values from the lower-right portion of a previous left-eye frame that are in a previous composite frame of the second type; and outputting a first control signal to cause a viewer's shuttered glasses to open for a left-eye perspective substantially for the first interval.

4. The method of claim 3, further comprising:

illuminating, for a duration of time within a second interval, each pixel/segment in the display area that is loaded with one (1) of one or more pixel values from the upper-left portion of right pixel values from the upper-left portion of the first right-eye frame that are in a first composite frame of the second type, or (2) of one or more pixel values from the lower-right portion of right pixel values from the lower-right portion of the first right-eye frame that are in the first composite frame of the first type; and outputting a second control signal to cause a viewer's shuttered glasses to open for a right-eye perspective substantially for the second interval.

5. The method of claim 4, further comprising outputting a third control signal to cause the shuttered glasses to close for a left-eye perspective substantially for the second interval.

6. The method of claim 5, wherein the second control signal and the third control signal are a single control signal.

7. The method of claim 1, further comprising preventing a viewer from seeing an image from the display area through the shuttered glasses.

8. The method of claim 1, further comprising allowing a viewer to see image data of a single eye perspective through the shuttered glasses at any given time.

9. A three-dimensional imaging system comprising:

a display panel;

a pair of shuttered glasses; and a subsystem, implemented at least in part in hardware, that generates a composite frame of a first type, wherein the composite frame of the first type comprises an upper-left portion of left pixel values from an upper-left portion of a left-eye frame and a lower-right portion of right pixel values from a lower-right portion of a right-eye frame, wherein the left-eye frame corresponding to a media time, wherein the left-eye frame is among a sequence of left-eye frames respectively corresponding to a sequence of media times, wherein the right-eye frame corresponding to the media time, wherein the right-eye frame is among a sequence of right-eye frames respectively corresponding to the sequence of media times;

wherein the first composite frame of the first type comprises scan lines each of which comprises both left and right pixel values;

a subsystem, implemented at least in part in hardware, that outputs the composite frame of the first type to the display panel;

a subsystem, implemented at least in part in hardware, that generates a composite frame of a second type, wherein the composite frame of the second type comprises an upper-left portion of right pixel values from an upper-left portion of the right-eye frame and a lower-right portion of left pixel values from a lower-right portion of a second different left-eye frame, wherein the second different left-eye frame corresponding to a second different media time immediately following the media time, wherein the second different left-eye frame is among the sequence of left-eye frames;

wherein the first composite frame of the second type comprises scan lines each of which comprises both left and right pixel values;

a subsystem, implemented at least in part in hardware, that outputs the composite frame of the second type, subsequent in time to the composite frame of the first type, to the display panel.

10. The system of claim 9, further comprising:

a subsystem, implemented at least in part in hardware, that illuminates, for any duration of time within an interval, only pixels from a same perspective; and a subsystem, implemented at least in part in hardware, that outputs a control signal to cause a viewer's shuttered glasses to open for the same perspective substantially for the interval.

11. A method of three-dimensional imaging comprising:

determining, from image data, a first left-eye frame corresponding to a first media time, wherein the first left-eye frame is among a sequence of left-eye frames respectively corresponding to a sequence of media times;

determining, from the image data, a first right-eye frame corresponding to the first media time, wherein the first right-eye frame is among a sequence of right-eye frames respectively corresponding to the sequence of media times;

creating a first composite frame of a first type, the first composite frame of the first type comprising a first set of left pixel values from an upper-left portion of the first left-eye frame and a first set of right pixel values from a lower-right portion of the first right-eye frame;

wherein the first composite frame of the first type comprises scan lines each of which comprises both left and right pixel values;

outputting the first composite frame of the first type to a display area;

determining, from the image data, a second left-eye frame corresponding to a second media time, wherein the second left-eye frame is among the sequence of left-eye frames, and wherein the second media time immediately follows the first media time;

creating a first composite frame of a second type, the first composite frame of the second type comprising a second set of right pixel values from an upper-left portion of the first right-eye frame and a second set of left pixel values from a lower-right portion of the second left-eye frame;

wherein the first composite frame of the second type comprises scan lines each of which comprises both left and right pixel values; and outputting the first composite frame of the second type, subsequent in time to the first composite frame of the first type, to the display area;

wherein the method is performed by one or more computing devices.

12. The system of claim 9, wherein the lower-right portion of right-eye pixel values from the composite frame of the first type and the upper-left portion of right pixel values from the composite frame of the second type are complementary parts of the first right-eye frame.

13. The system of claim 10, further comprising outputting a second control signal to cause the shuttered glasses to close for a different perspective substantially for the interval.

14. The system of claim 13, wherein the control signal and the second control signal are a single control signal.

15. The system of claim 9, further comprising a subsystem, implemented at least in part in hardware, that prevents a viewer from seeing an image from the display area through the shuttered glasses.

16. The system of claim 9, further comprising a subsystem, implemented at least in part in hardware, that allows a viewer to see image data of a single eye perspective through the shuttered glasses at any given time.

* * * * *